United States Patent
Taniguchi et al.

(10) Patent No.: US 10,000,700 B2
(45) Date of Patent: *Jun. 19, 2018

(54) NEMATIC LIQUID CRYSTAL COMPOSITION

(71) Applicant: DIC Corporation, Tokyo (JP)

(72) Inventors: Shirou Taniguchi, Kita-adachi-gun (JP); Joji Kawamura, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/320,974

(22) PCT Filed: Jul. 28, 2015

(86) PCT No.: PCT/JP2015/071323
§ 371 (c)(1),
(2) Date: Dec. 21, 2016

(87) PCT Pub. No.: WO2016/017614
PCT Pub. Date: Feb. 4, 2016

(65) Prior Publication Data
US 2017/0198219 A1 Jul. 13, 2017

(30) Foreign Application Priority Data
Jul. 31, 2014 (JP) .................. 2014-156266

(51) Int. Cl.
*G02F 1/1333* (2006.01)
*C09K 19/34* (2006.01)
*C09K 19/54* (2006.01)
*C09K 19/02* (2006.01)
*G02F 1/1362* (2006.01)
*C09K 19/04* (2006.01)

(52) U.S. Cl.
CPC ...... *C09K 19/3402* (2013.01); *C09K 19/0208* (2013.01); *C09K 19/0216* (2013.01); *C09K 19/542* (2013.01); *G02F 1/1362* (2013.01); *C09K 2019/0466* (2013.01); *C09K 2019/3422* (2013.01)

(58) Field of Classification Search
CPC .............. C09K 19/3402; C09K 19/542; C09K 19/0208; C09K 19/0216; C09K 2019/3422; C09K 2019/0466; G02F 1/1333; G02F 1/1362
USPC .............. 252/299.01, 299.6, 299.61; 428/1.1
See application file for complete search history.

(56) References Cited

U.S. PATENT DOCUMENTS

| 4,818,431 A | 4/1989 | Eidenschink et al. |
| 5,032,313 A | 7/1991 | Goto et al. |
| 5,324,449 A | 6/1994 | Kurmeier et al. |
| 5,399,292 A | 3/1995 | Buchecker et al. |
| 5,487,845 A | 1/1996 | Reiffenrath et al. |
| 5,858,270 A | 1/1999 | Matsui et al. |
| 5,976,407 A | 11/1999 | Tarumi et al. |

(Continued)

FOREIGN PATENT DOCUMENTS

| CN | 102186821 A | 9/2011 |
| DE | 41 32 006 A1 | 4/1993 |

(Continued)

OTHER PUBLICATIONS

International Search Report dated Sep. 29, 2015, issued in counterpart International Application No. PCT/JP2015/071323 (3 pages).

(Continued)

*Primary Examiner* — Geraldina Visconti
(74) *Attorney, Agent, or Firm* — Westerman, Hattori, Daniels & Adrian, LLP

(57) ABSTRACT

The present invention provides a liquid crystal composition having positive dielectric anisotropy and containing at least one compound represented by general formula (LC0):

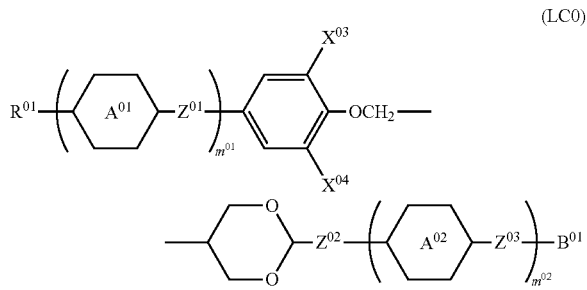

(LC0)

and at least one compound represented by general formula (LC1):

$$R^{11}\text{-}(A^{11}\text{-}Z^{11})_{m11}\text{-}A^{12}\text{-}Z^{12}\text{-}A^{13}\text{-}R^{12}$$ (LC1)

The liquid crystal composition according to the present invention has refractive index anisotropy (Δn) adjusted to the desired level and a decrease in nematic phase-isotropic liquid phase transition temperature ($T_{ni}$) and an increase in the nematic phase lower limit temperature are suppressed so as to achieve a sufficiently low viscosity (η) without degrading the nematic phase temperature range. When the liquid crystal composition of the present invention is used to produce a liquid crystal display device, a highly practical and highly reliable liquid crystal display device with high response speed and capacity for low-voltage drive is obtained.

11 Claims, No Drawings

(56) References Cited

U.S. PATENT DOCUMENTS

| | | | |
|---|---|---|---|
| 6,051,288 A | 4/2000 | Kondo et al. | |
| 6,200,654 B1 | 3/2001 | Poetsch et al. | |
| 6,210,603 B1 | 4/2001 | Kondo et al. | |
| 6,579,577 B2 | 6/2003 | Kondo et al. | |
| 7,001,646 B2 | 2/2006 | Heckmeier et al. | |
| 7,175,891 B2 | 2/2007 | Heckmeier et al. | |
| 7,250,198 B2 | 7/2007 | Heckmeier et al. | |
| 7,361,388 B2 | 4/2008 | Kirsch et al. | |
| 7,604,851 B2 | 10/2009 | Heckmeier et al. | |
| 7,674,507 B2 | 3/2010 | Lietzau et al. | |
| 7,704,566 B2 | 4/2010 | Heckmeier et al. | |
| 7,767,277 B2 | 8/2010 | Lietzau et al. | |
| 8,168,083 B2 | 5/2012 | Goebel et al. | |
| 8,916,718 B2 | 12/2014 | Tojo et al. | |
| 9,039,929 B2* | 5/2015 | Kaneoya | C09K 19/20 |
| | | | 252/299.01 |
| 9,079,836 B2 | 7/2015 | Tojo et al. | |
| 9,181,484 B2 | 11/2015 | Tojo et al. | |
| 9,315,727 B2 | 4/2016 | Tojo et al. | |
| 9,573,923 B2* | 2/2017 | Tojo | C07D 309/06 |
| 9,637,466 B2* | 5/2017 | Tojo | C07D 319/06 |
| 2002/0166994 A1 | 11/2002 | Kondo et al. | |
| 2003/0236304 A1 | 12/2003 | Jolidon et al. | |
| 2005/0017216 A1 | 1/2005 | Poetsch et al. | |
| 2005/0092966 A1 | 5/2005 | Heckmeier et al. | |
| 2006/0061699 A1 | 3/2006 | Kirsch et al. | |
| 2006/0263542 A1 | 11/2006 | Kirsch et al. | |
| 2007/0051919 A1 | 3/2007 | Kondou et al. | |
| 2008/0132716 A1 | 6/2008 | Lietzau et al. | |
| 2009/0065739 A1 | 3/2009 | Haseba et al. | |
| 2009/0302273 A1 | 12/2009 | Tanaka | |
| 2010/0127211 A1 | 5/2010 | Tanaka | |
| 2010/0308267 A1 | 12/2010 | Wittek et al. | |
| 2010/0328600 A1 | 12/2010 | Shimada et al. | |
| 2011/0024682 A1 | 2/2011 | Czanta et al. | |
| 2011/0037024 A1 | 2/2011 | Kobayashi | |
| 2011/0193022 A1 | 8/2011 | Tanaka et al. | |
| 2011/0315924 A1 | 12/2011 | Kojima et al. | |
| 2014/0225036 A1 | 8/2014 | Kaneoya et al. | |
| 2016/0186059 A1 | 6/2016 | Kaneoya et al. | |

FOREIGN PATENT DOCUMENTS

| | | |
|---|---|---|
| EP | 0 156 554 A2 | 10/1985 |
| JP | H02-501311 A | 5/1990 |
| JP | H02-233626 A | 9/1990 |
| JP | 2-289529 A | 11/1990 |
| JP | H03-122199 A | 5/1991 |
| JP | H04-501575 A | 3/1992 |
| JP | H05-263461 A | 10/1993 |
| JP | H06-504032 A | 5/1994 |
| JP | 6-239776 A | 8/1994 |
| JP | 9-157202 A | 6/1997 |
| JP | 10-67988 A | 3/1998 |
| JP | H10-101599 A | 4/1998 |
| JP | 10-204016 A | 8/1998 |
| JP | 11-29771 A | 2/1999 |
| JP | 2000-355560 A | 12/2000 |
| JP | 2001-019649 A | 1/2001 |
| JP | 3122199 B2 | 1/2001 |
| JP | 2003-176251 A | 6/2003 |
| JP | 2003-183656 A | 7/2003 |
| JP | 2003-533557 A | 11/2003 |
| JP | 2004-529214 A | 9/2004 |
| JP | 2004-352721 A | 12/2004 |
| JP | 2004-355560 A | 12/2004 |
| JP | 2005-517079 A | 6/2005 |
| JP | 2005-220355 A | 8/2005 |
| JP | 2005-232455 A | 9/2005 |
| JP | 2005-529176 A | 9/2005 |
| JP | 2006-515283 A | 5/2006 |
| JP | 2006-328400 A | 12/2006 |
| JP | 2007-501301 A | 1/2007 |
| JP | 2007-503485 A | 2/2007 |
| JP | 2007-51291 A | 3/2007 |
| JP | 2007-070295 A | 3/2007 |
| JP | 2008-69153 A | 3/2008 |
| JP | 2008-545669 A | 12/2008 |
| JP | 2009-067780 A | 4/2009 |
| JP | 2009-84560 A | 4/2009 |
| JP | 2009-179813 A | 8/2009 |
| JP | 2009-185285 A | 8/2009 |
| JP | 2009-292730 A | 12/2009 |
| JP | 2010-500980 A | 1/2010 |
| JP | 2010-275390 A | 12/2010 |
| JP | 2011-136998 A | 7/2011 |
| JP | 2012-117062 A | 6/2012 |
| JP | 2013-170246 A | 9/2013 |
| JP | 5-382268 B1 | 1/2014 |
| JP | 5435318 B1 | 3/2014 |
| JP | 2014-105178 A | 6/2014 |
| KR | 20060119879 A | 11/2006 |
| WO | 96/11897 A1 | 4/1996 |
| WO | 96/32365 A1 | 10/1996 |
| WO | 96/032365 A1 | 10/1996 |
| WO | 97/37960 A1 | 10/1997 |
| WO | 98/23564 A1 | 6/1998 |
| WO | 2005/019377 A1 | 3/2005 |
| WO | 2008/105286 A1 | 9/2008 |
| WO | 2009/034867 A1 | 3/2009 |
| WO | 2009/125668 A1 | 10/2009 |
| WO | 2009/150963 A1 | 12/2009 |
| WO | 2010/047260 A1 | 4/2010 |
| WO | 2012/161178 A1 | 11/2012 |
| WO | 2013/018796 A1 | 2/2013 |
| WO | 2013/099754 A1 | 7/2013 |
| WO | 2013/141116 A1 | 9/2013 |
| WO | 2013/172162 A1 | 11/2013 |
| WO | 2015/029876 A1 | 3/2015 |

OTHER PUBLICATIONS

Decision to Grant a Patent dated Feb. 26, 2016, issued in counterpart Japanese Patent Application No. 2015-560121, w/English translation (5 pages).
International Search Report dated Nov. 18, 2014, issued in counterpart Application No. PCT/JP2014/071903.
Decision to Grant a Patent dated Apr. 2, 2015, issued in JP2014-556873.
Decision to Grant a Patent dated Apr. 2, 2015, issued in JP2014-556869.
International Search Report dated Oct. 7, 2014, issued in PCT/JP2014/068784.
International Search Report dated Oct. 7, 2014, issued in PCT/JP2014/072633.
Written Opinion dated Oct. 7, 2014, issued in PCT/JP2014/068784.
Written Opinion dated Oct. 7, 2014, issued in PCT/JP2014/072633.
Notice of Reason for Refusal dated Jan. 29, 2015, issued in JP2014-556873.
Notice of Reason for Refusal dated Jan. 29, 2015, issued in JP2014-556869.
Miroslav Kuchar et al., "Use of Qsar in Design of Antiinflammatory Fluorinated Arylalkanoic Acids", Collection of Czechoslovak Chemical Communications, 1990, vol. 55, No. 1, pp. 296-306.
Resistry(stn) [Online], Oct. 3, 2011 (Oct. 3, 2011), (retrieval date: Mar. 11, 2013 (Mar. 11, 2013)) CAS resistration No. 1334226-61-7.
Non-Final Office Action dated Aug. 12, 2016, issued in U.S. Appl. No. 14/904,226.
Notice of Allowance dated Jan. 12, 2017, issued in U.S. Appl. No. 14/904,226.
Non-Final Office Action dated Jul. 9, 2016, issued in U.S. Appl. No. 14/907,034.
Notice of Allowance dated Oct. 12, 2016, issued in U.S. Appl. No. 14/907,034.

* cited by examiner

NEMATIC LIQUID CRYSTAL COMPOSITION

TECHNICAL FIELD

The present invention relates to a nematic liquid crystal composition that is useful as an electro-optical liquid crystal display material and has positive dielectric anisotropy ($\Delta\varepsilon$).

BACKGROUND ART

Liquid crystal display devices are increasingly used in watches, calculators, various measurement instruments, automobile panels, word processors, electronic organizers, printers, computers, televisions, clocks, advertising boards, etc. Representative examples of the liquid crystal display mode include twisted nematic (TN) mode, super twisted nematic (STN) mode, VA mode that is characterized by vertical alignment and use of thin film transistors (TFTs), and in-plane-switching (IPS)/FFS mode characterized by horizontal alignment. Liquid crystal compositions used in these liquid crystal display devices are required to be stable against external factors such as moisture, air, heat, and light, exhibit a liquid crystal phase in a temperature range as wide as possible with room temperature at the center, have low viscosity, and operate at low drive voltage. A liquid crystal composition is composed of several to dozens of compounds in order to optimize dielectric anisotropy ($\Delta\varepsilon$) and/or refractive index anisotropy ($\Delta n$) and the like for each individual display device.

A vertical alignment display uses a liquid crystal composition with a negative $\Delta\varepsilon$ and a horizontal alignment display such as a TN, STN, or IPS display uses a liquid crystal composition having a positive $\Delta\varepsilon$. Recently, there has been a report of a drive mode with which a liquid crystal composition having a positive $\Delta\varepsilon$ is aligned vertically in the absence of the applied voltage and a horizontal electric field is applied as in the IPS/FFS mode devices. There is now increasing need for liquid crystal compositions with positive $\Delta\varepsilon$. Meanwhile, pursuit for lower voltage drive, high speed response, and wide operation temperature range is common for all driving modes. In other words, a positive $\Delta\varepsilon$ with a large absolute value, low viscosity ($\eta$), and a high nematic phase-isotropic liquid phase transition temperature ($T_{ni}$) are being required. Due to the setting of the product of $\Delta n$ and the cell gap (d), i.e., $\Delta n \times d$, the $\Delta n$ of the liquid crystal composition must be adjusted to be in an appropriate range for the cell gap. Moreover, when the liquid crystal display device is to be adopted to televisions etc., high response speed is important and thus a liquid crystal composition with small $\gamma_1$ is required.

Liquid crystal compositions that use a compound having a positive $\Delta\varepsilon$ represented by formula (A-1) or (A-2) as a constitutional component of the liquid crystal composition have been disclosed (PTL 1 and PTL 2). However, these liquid crystal compositions did not achieve sufficiently low viscosity. There have also been disclosure of compounds having a —CF$_2$O— linking group represented by formulae (A-3) and (A-4) and liquid crystal compositions that use these compounds. However, these liquid crystal compositions also did not achieve sufficiently low viscosity (PTL 3 and PTL 4).

[Chem. 1]

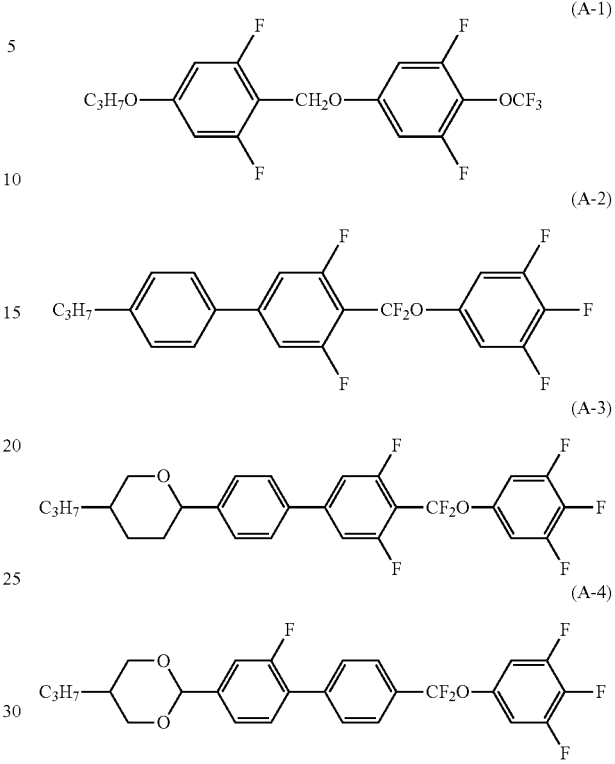

CITATION LIST

Patent Literature

PTL 1: WO 96/032365
PTL 2: Japanese Unexamined Patent Application Publication No. 2003-183656
PTL 3: Japanese Unexamined Patent Application Publication No. 2011-136998
PTL 4: Japanese Unexamined Patent Application Publication No. 2008-69153

SUMMARY OF INVENTION

Technical Problem

An object of the present invention is to provide a highly reliable, positive dielectric anisotropy ($\Delta\varepsilon$) liquid crystal composition having the dielectric anisotropy ($\Delta\varepsilon$) and refractive index anisotropy ($\Delta n$) adjusted to desired levels, in which a decrease in nematic phase-isotropic liquid phase transition temperature ($T_{ni}$) and an increase in the nematic phase lower limit temperature are suppressed so as not to degrade the nematic phase temperature range, the viscosity ($\eta$) is sufficiently low, and the response speed is high when the composition is used in a liquid crystal display device.

Solution to Problem

The inventors of the present invention have studied various fluorobenzene derivatives and found that the object described above can be achieved by a combination of particular compounds. Thus, the present invention has been made.

The present invention provides a liquid crystal composition having positive dielectric anisotropy. The liquid crystal composition contains at least one compound represented by general formula (LC0):

[Chem. 2]

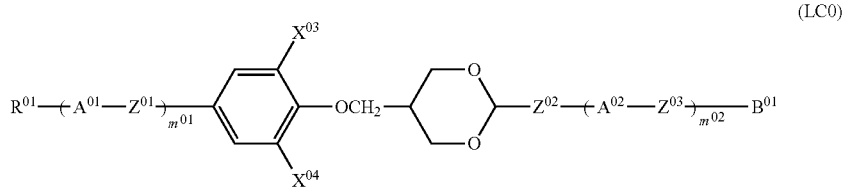

(LC0)

(In the formula, $R^{01}$ represents an alkyl group having 1 to 15 carbon atoms, one or more $CH_2$ groups in the alkyl group may each be substituted with —O—, —CH=CH—, —CO—, —OCO—, —COO—, —C≡C—, —CF$_2$O—, or —OCF$_2$— so long as oxygen atoms are not directly adjacent to each other, one or more hydrogen atoms in the alkyl group may each be substituted with a halogen, $A^{01}$ and $A^{02}$ each independently represent a trans-1,4-cyclohexylene group, a 1,4-phenylene group, a 3-fluoro-1,4-phenylene group, a 3,5-difluoro-1,4-phenylene group, a 1,4-cyclohexenylene group, a 1,4-bicyclo[2.2.2]octylene group, a naphthalene-2,6-diyl group, a decahydronaphthalene-2,6-diyl group, or a 1,2,3,4-tetrahydronaphthalene-2,6-diyl group, $B^{01}$ represents one of the following structures:

[Chem. 3]

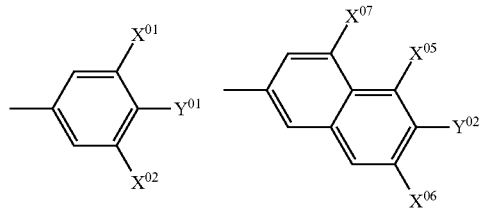

(In the structures, $X^{01}$, $X^{02}$, $X^{05}$, $X^{06}$, and $X^{07}$ each independently represent a hydrogen atom or a fluorine atom and $Y^{01}$ and $Y^{02}$ each independently represent a chlorine atom, a cyano group, a fluorine atom, —CF$_3$, or —OCF$_3$), $Z^{01}$, $Z^{02}$, and $Z^{03}$ each independently represent a single bond, —CH=CH—, —C≡C—, —CH$_2$CH$_2$—, —(CH$_2$)$_4$—, —OCH$_2$—, —CH$_2$O—, —OCF$_2$—, or —CF$_2$O—, $X^{03}$ and $X^{04}$ each independently represent a hydrogen atom or a fluorine atom, $m^{01}$ and $m^{02}$ each independently represent an integer of 0 to 2, $m^{01}+m^{02}$ is 0, 1, or 2, and when two or more $A^{01}$, $A^{02}$, $Z^{01}$, and/or $Z^{03}$ are present, they may be the same or different), and at least one compound represented by general formula (LC1):

[Chem. 4]

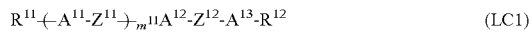

(LC1)

(In the formula, $R^{11}$ and $R^{12}$ each independently represent an alkyl group having 1 to 15 carbon atoms, one or more —CH$_2$— in the alkyl group may each be substituted with —O—, —CH=CH—, —CO—, —OCO—, —COO—, —C≡C—, —CF$_2$O—, or —OCF$_2$— so long as oxygen atoms are not directly adjacent to each other, one or more hydrogen atoms in the alkyl group may each be substituted with a halogen, $A^{11}$ to $A^{13}$ each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 1,4-cyclohexenylene group, a tetrahydropyran-2,5-diyl group, a 1,3-dioxane-2,5-diyl group, a 1,4-bicyclo[2.2.2]octylene group, a naphthalene-2,6-diyl group, a decahydronaphthalene-2,6-diyl group, or a 1,2,3,4-tetrahydronaphthalene-2,6-diyl group, $Z^{11}$ and $Z^{12}$ each independently represent a single bond, —CH=CH—, —C≡C—, —CH$_2$CH$_2$—, —(CH$_2$)$_4$—, —OCH$_2$—, —CH$_2$O—, —OCF$_2$—, or —CF$_2$O—, $m^{11}$ represents 0, 1, or 2, and when two or more $A^{11}$ and/or $Z^{11}$ are present, they may be the same or different). Also provided is a liquid crystal display device that uses this liquid crystal composition.

Advantageous Effects of Invention

A liquid crystal composition according to the present invention has a positive Δ∈ having an absolute value adjusted to the desired level and refractive index anisotropy (Δn) adjusted to the desired level, has low rotational viscosity ($γ_1$) and excellent liquid crystal properties, and exhibits a stable liquid crystal phase in a wide temperature range. Moreover, since the liquid crystal composition is chemically stable against heat, light, water, etc., and has good solubility, low-temperature phase stability is excellent. When the liquid crystal composition according to the present invention is used to form a liquid crystal display device, a highly useful, high-reliability liquid crystal display device having high response speed and enabling low-voltage driving is obtained.

DESCRIPTION OF EMBODIMENTS

The liquid crystal composition according to the invention of the present application contains at least one compound represented by general formula (LC0) and at least one compound represented by general formula (LC1). Because a liquid crystal composition that contains a compound represented by general formula (LC0) and a compound represented by general formula (LC1) has a positive Δ∈ and has the absolute value of Δ∈ and the refractive index anisotropy (Δn) adjusted to desired levels, has low viscosity, and exhibits a stable liquid crystal phase at low temperatures, the liquid crystal composition can be regarded as a highly useful liquid crystal composition.

In general formula (LC0):

[Chem. 5]

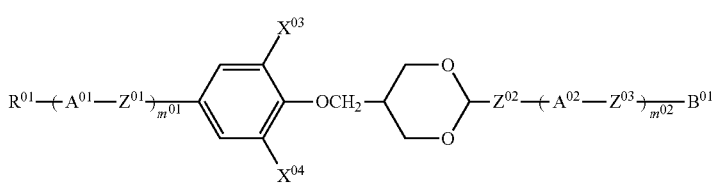

(LC0)

$R^{01}$ preferably represents an alkyl group having 1 to 8 carbon atoms or an alkenyl group having 2 to 8 carbon atoms and more preferably represents an alkyl group having 1 to 5 carbon atoms or an alkenyl group having 2 to 5 carbon atoms in order to decrease viscosity. $R^{01}$ is preferably linear. When $R^{01}$ represents an alkenyl group, it is preferably selected from the groups represented by formula (R1) to formula (R5) (in each formula, the black dot represents a linking point to a ring). When $A^{01}$ represents a trans-1,4-cyclohexylene group, these alkenyl groups are preferable and formula (R1), formula (R2), and formula (R4) are more preferable.

[Chem. 6]

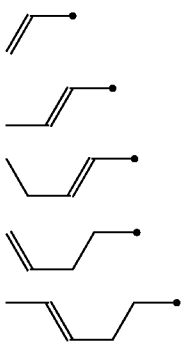

(R1)
(R2)
(R3)
(R4)
(R5)

$A^{01}$ and $A^{02}$ preferably each independently represent a trans-1,4-cyclohexylene group, a naphthalene-2,6-diyl group, or a 1,4-phenylene group and more preferably a trans-1,4-cyclohexylene group in order to decrease viscosity. In order to increase $\Delta\varepsilon$, $A^{01}$ and $A^{02}$ preferably each independently represent a 3-fluoro-1,4-phenylene group or a 3,5-difluoro-1,4-phenylene group and more preferably a 3,5-difluoro-1,4-phenylene group. In order to increase $T_{\to i}$, a trans-1,4-cyclohexylene group or a 1,4-phenylene group is preferable.

In order to decrease viscosity, $B^{01}$ preferably represents the following:

[Chem. 7]

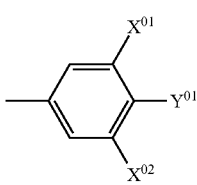

In order to increase $T_{\to i}$,

[Chem. 8]

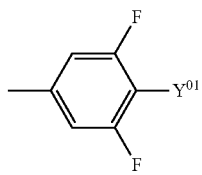

the above is preferable.

$X^{01}$, $X^{02}$, $X^{05}$, $X^{06}$, and $X^{07}$ preferably each independently represent a hydrogen atom in order to decrease viscosity and increase $T_{\to i}$. In order to increase $\Delta\varepsilon$, a fluorine atom is preferable.

When $X^{01}$ and $X^{02}$ each independently represent a fluorine atom or a hydrogen atom, the following is preferable in order to increase $\Delta\varepsilon$:

[Chem. 9]

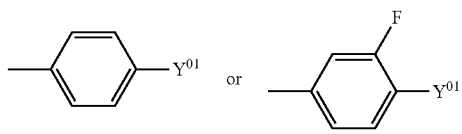

In order to decrease viscosity,

[Chem. 10]

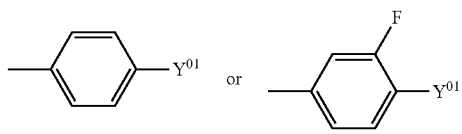

the above is preferable.

When $X^{05}$ to $X^{07}$ each independently represent a fluorine atom or a hydrogen atom, the following is preferable in order to increase $\Delta\varepsilon$:

[Chem. 11]

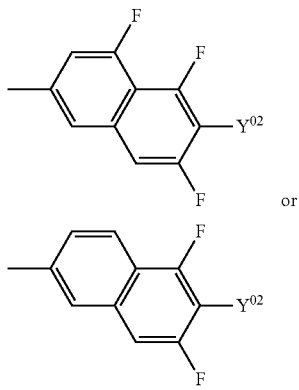

In order to decrease viscosity,

[Chem. 12]

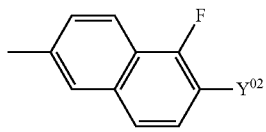

the above is preferable.

$B^{01}$ is particularly preferably any one selected from the following partial structures:

[Chem. 13]

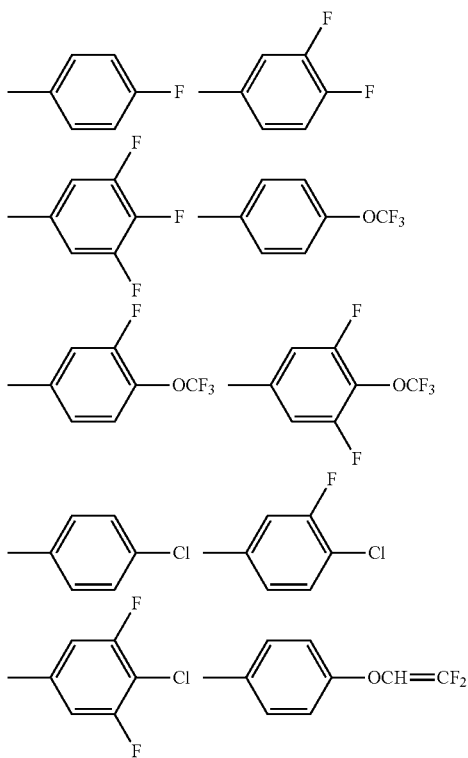

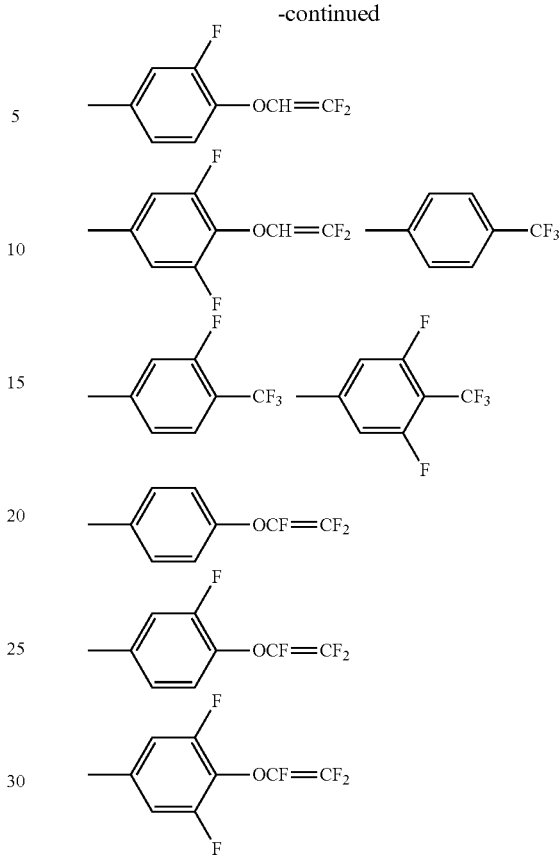

$Y^{01}$ and $Y^{02}$ preferably each represent a fluorine atom, —$CF_3$, or —$OCF_3$ in order to improve the nematic phase lower limit temperature and enhance low-temperature operation and storage property of the liquid crystal composition. In order to increase $\Delta\Sigma$, a fluorine atom, a cyano group, —$CF_3$, or —$OCF_3$ is preferable, and in order to decrease viscosity, a fluorine atom is preferable. In view of stability of the compound, a fluorine atom, —$CF_3$, or —$OCF_3$ is preferable.

$X^{03}$ and $X^{04}$ each independently represent a hydrogen atom or a fluorine atom; however, in order to increase $\Delta\in$, a fluorine atom is preferable and in order to improve solubility, a fluorine atom is preferable. At least one selected from $X^{03}$ and $X^{04}$ preferably represents a fluorine atom and more preferably $X^{03}$ and $X^{04}$ both represent a fluorine atom from the viewpoint of $\Delta\Sigma$ and solubility.

In order to decrease viscosity, $Z^1$, $Z^2$, and $Z^3$ preferably each independently represent —$CH_2O$—, —$OCH_2$—, —$CF_2O$—, —$OCF_2$—, —$CF=CF$—, —$CH_2CH_2$—, —$CH=CH$—, —$C\equiv C$—, or a single bond, more preferably —$CF_2O$—, —$OCF_2$—, —$CH_2CH_2$—, or a single bond, and yet more preferably a single bond. In order to increase $T_{\rightarrow i}$, —$C\equiv C$— or a single bond is preferable.

When q is of importance, $m^{01}$ and $m^{02}$ preferably satisfy $m^{01}+m^{02}=0$ or 1. When $m^{01}+m^{02}=1$, $m^{01}$ preferably represents 0 and $m^{02}$ preferably represents 1. When $T_{\rightarrow i}$ is of importance, $m^{01}+m^{02}$ is preferably 1 or 2. In order to increase miscibility with the liquid crystal composition, $m^{01}+m^{02}$ is preferably 0 or 1.

In a compound represented by general formula (0), hetero atoms are never directly bonded to each other.

In a compound represented by general formula (0), the number of F substitution in general formula (LC0) is preferably 2 to 7.

The compound represented by general formula (LC0) is preferably a compound that satisfies at least one of the following items:

Compound in which $m^{01}+m^{02}$ is 0

Compound in which $m^{01}$ represents 0 and $m^{02}$ represents 1

Compound in which $m^{01}$ represents 1 and $m^{02}$ represents 0

Compound in which $m^{01}$ represents 2 and two or more $Z^{01}$ each represent a single bond Compound in which $Z^{02}$ represents a single bond Compound in which $Z^{01}$, $Z^{02}$, and $Z^{03}$ each represent a single bond The liquid crystal compound represented by general formula (LC0) is more preferably a compound represented by any of general formulae (LC0-a) to (LC0-j) below (in the formula, $R^{01}$, $A^{01}$, $A^{02}$, $X^{01}$ to $X^{07}$, $Y^{01}$, and $Y^{02}$ are the same as $R^{01}$, $A^{01}$, $A^{02}$, $X^{01}$ to $X^{06}$, $Y^{01}$, and $Y^{02}$ in general formula (LC0) and $X^{08}$ to $X^{13}$ each represent a hydrogen atom or a fluorine atom). The liquid crystal composition of the present invention preferably contains at least one selected from compounds represented by (LC0-a) to (LC0-i) as the compound represented by general formula (LC0).

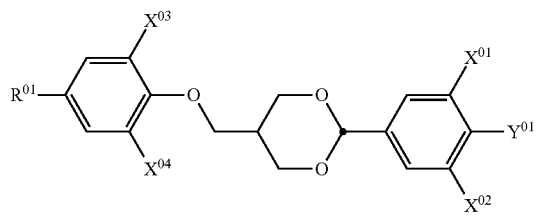

(LC0-a)

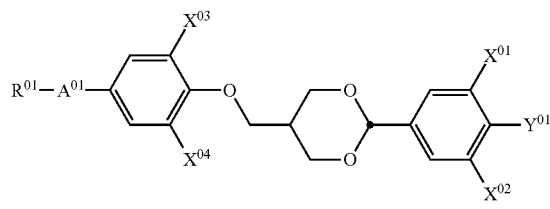

(LC0-b)

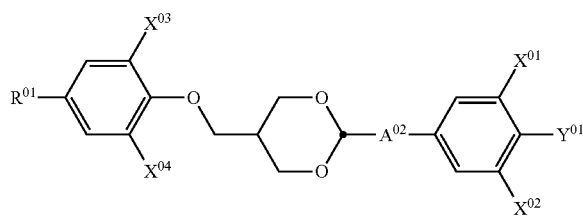

(LC0-c)

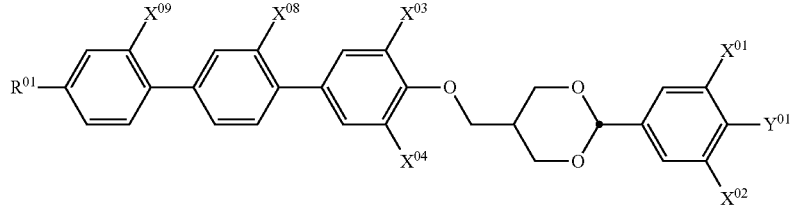

(LC0-d)

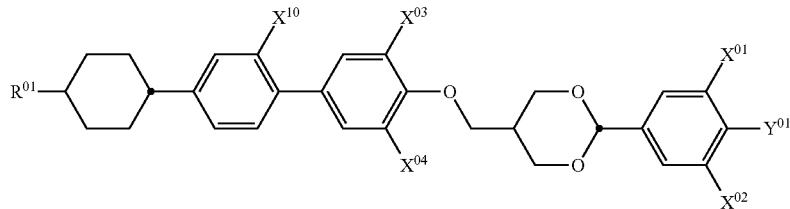

(LC0-e)

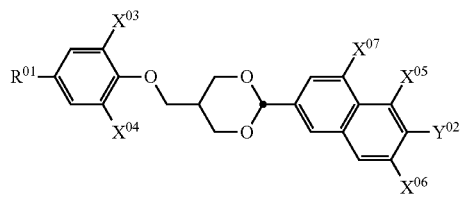

(LC0-f)

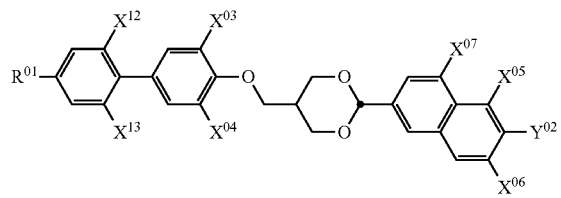

(LC0-g)

(LC0-h) 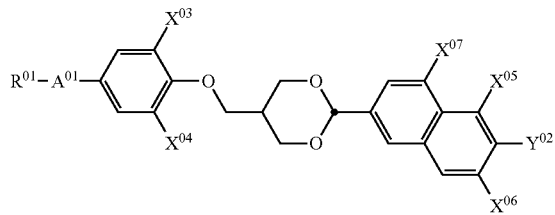
(LC0-i) 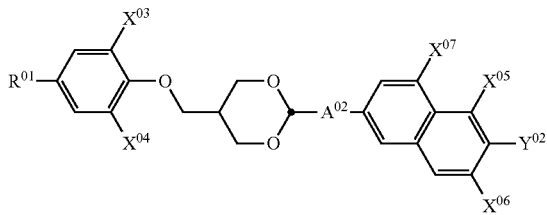
As the compound represented by general formula (LC0-a), compounds represented by general formula (LC0-a1) to general formula (LC0-a11) below are more preferable and a compound represented by general formula (0-a1) is yet more preferable.
[Chem. 15]
(LC0-a1) 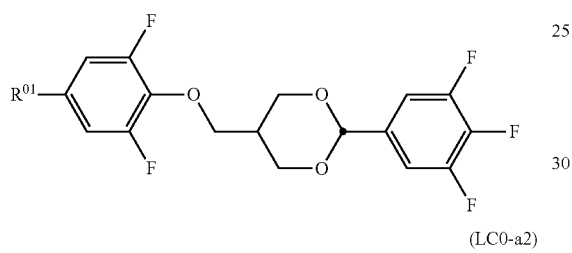
(LC0-a2) 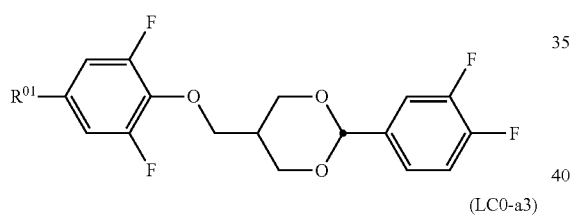
(LC0-a3) 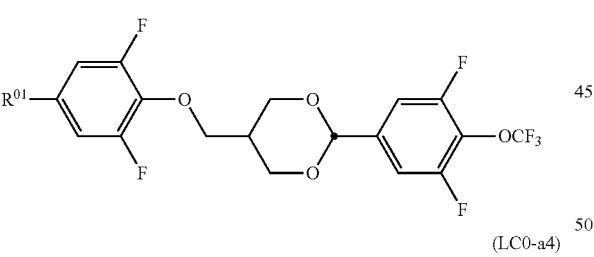
(LC0-a4) 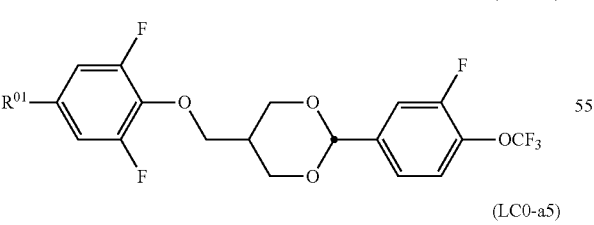
(LC0-a5) 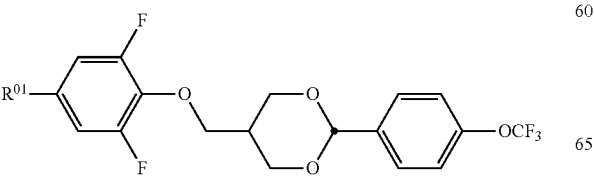
-continued
(LC0-a6) 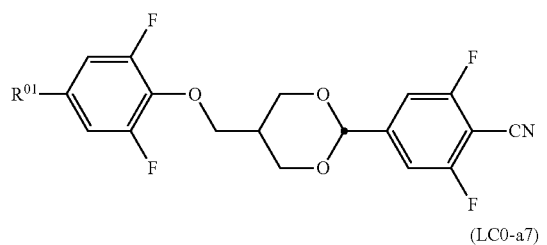
(LC0-a7) 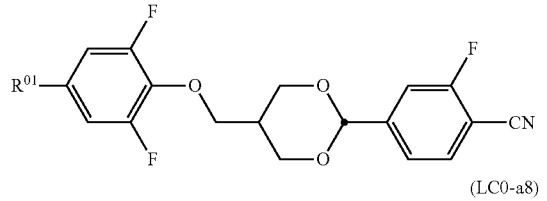
(LC0-a8) 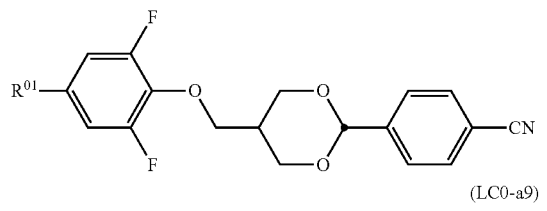
(LC0-a9) 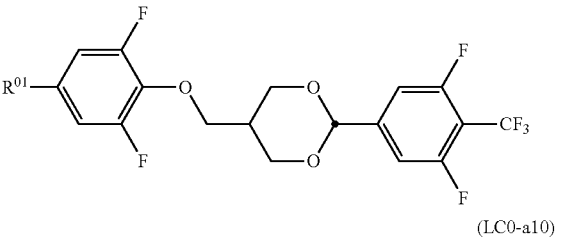
(LC0-a10) 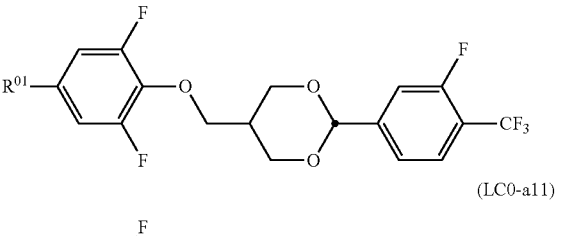
(LC0-a11)

(In the formulae, R$^{01}$ is the same as R$^{01}$ in general formula (LC0).)
As the compound represented by general formula (LC0-b), compounds represented by general formula (LC0-b1) to general formula (LC0-b24) below are more preferable.
[Chem. 16]
(LC0-b1)
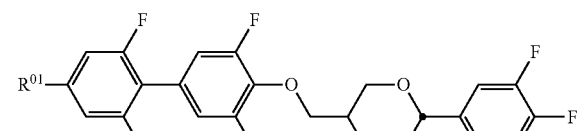
(LC0-b2)
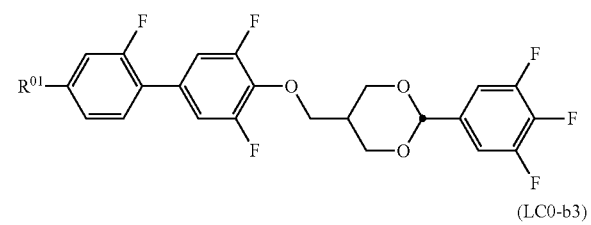
(LC0-b3)
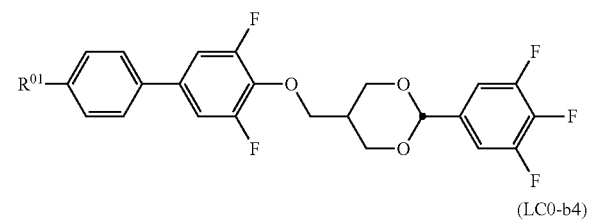
(LC0-b4)
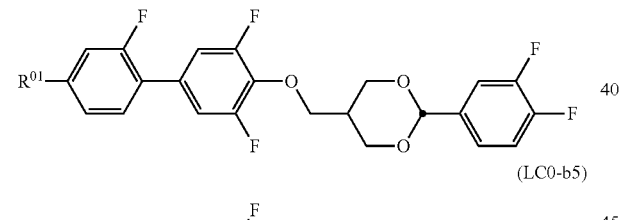
(LC0-b5)
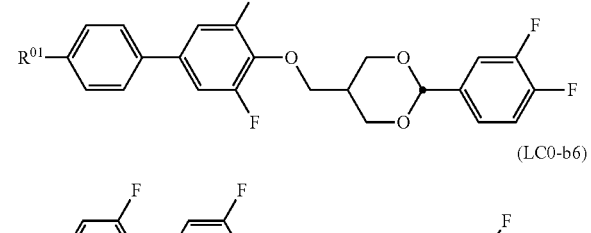
(LC0-b6)
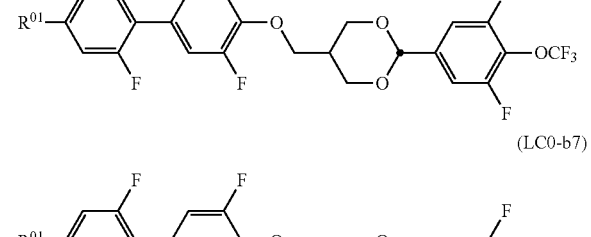
(LC0-b7)
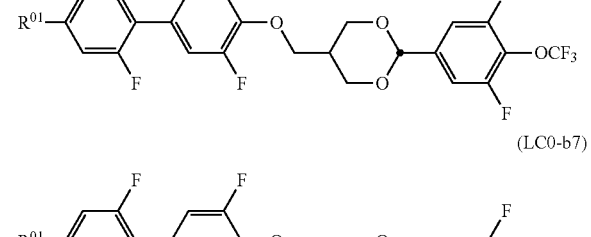
(LC0-b8)
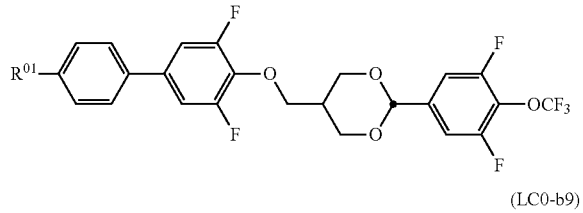
(LC0-b9)
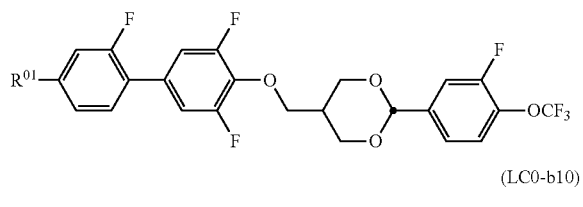
(LC0-b10)
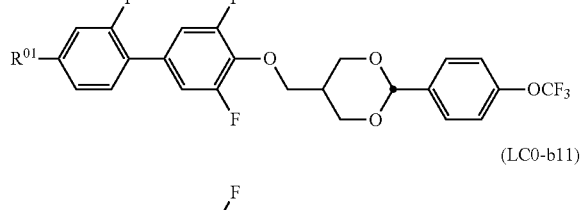
(LC0-b11)
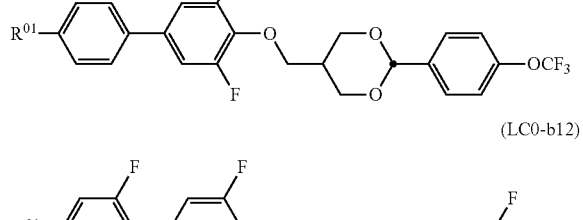
(LC0-b12)
(LC0-b13)
(LC0-b14)
(LC0-b15)

(LC0-b16)
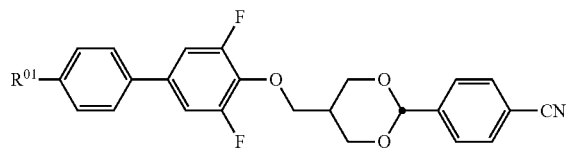

[Chem. 17]

(LC0-b17)
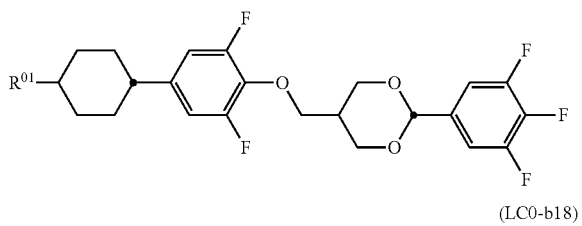

(LC0-b18)

(LC0-b19)
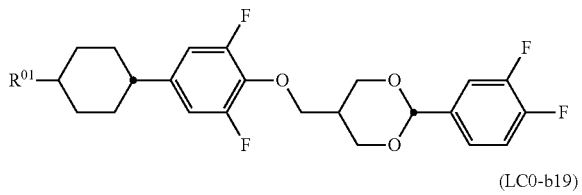

(LC0-b20)
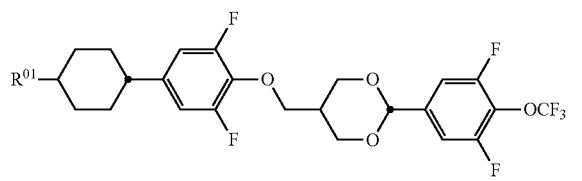

(LC0-b21)
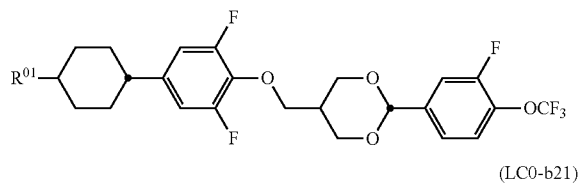

(LC0-b22)
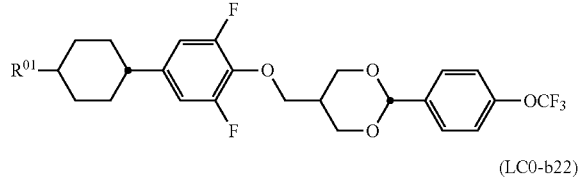

(LC0-b23)
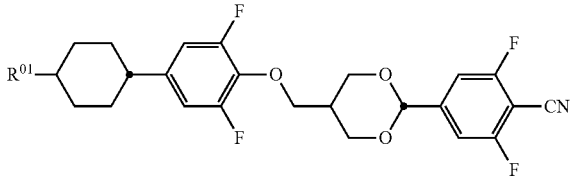

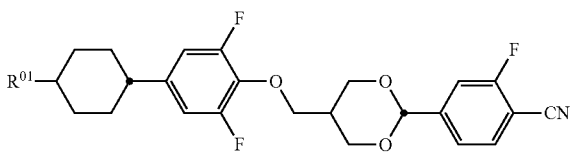

(LC0-b24)
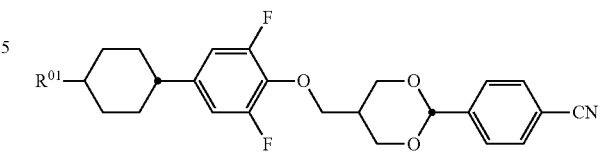

(In the formulae, $R^{01}$ is the same as $R^{01}$ in general formula (LC0).)

As the compound represented by general formula (LC0-c), compounds represented by general formula (LC0-c1) to general formula (LC0-c17) below are preferable, compounds represented by general formula (LC0-c1) to general formula (LC0-c3) are more preferable, and compounds represented by general formula (LC0-c2) and general formula (LC0-c3) are yet more preferable.

[Chem. 18]

(LC0-c1)

(LC0-c2)
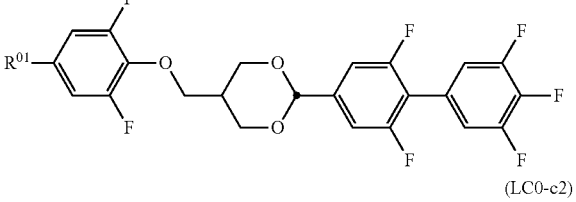

(LC0-c3)
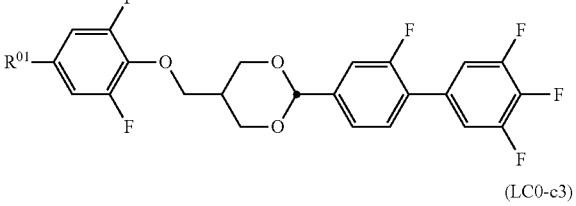

(LC0-c4)
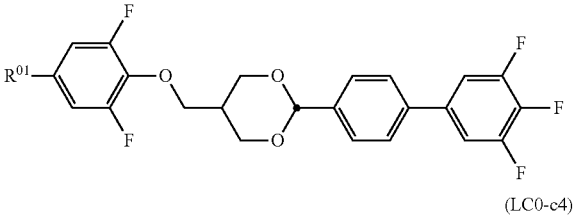

(LC0-c5)
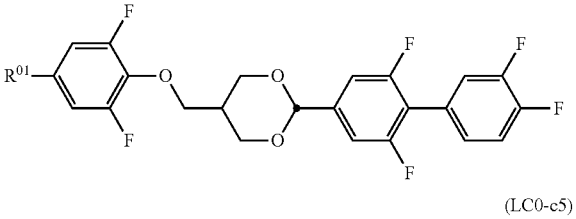

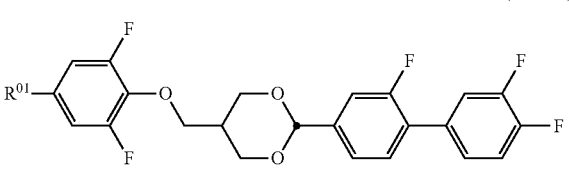

-continued (LC0-c6)
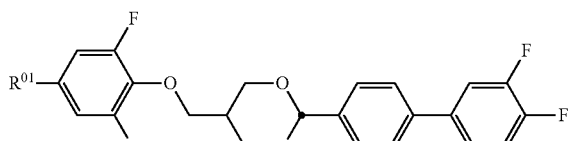

(LC0-c7)
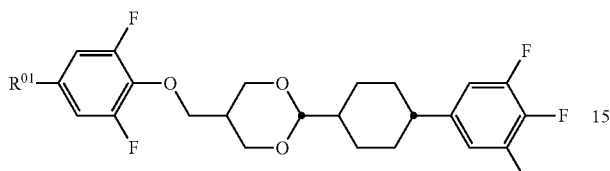

(LC0-c8)
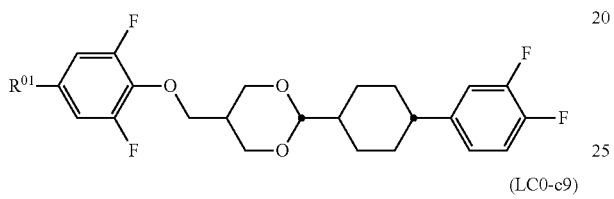

(LC0-c9)
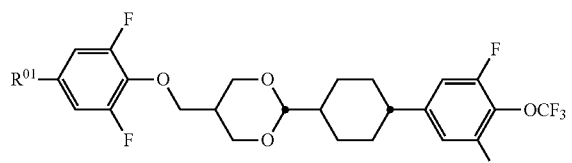

(LC0-c10)
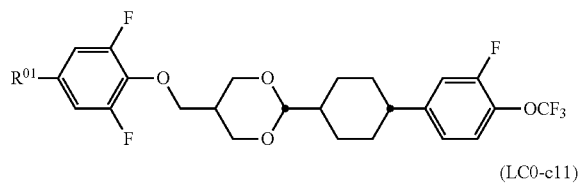

(LC0-c11)
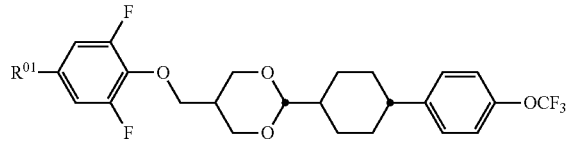

(In the formulae, $R^{01}$ is the same as $R^{01}$ in general formula (LC0).)

As the compound represented by general formula (LC0-d), compounds represented by general formula (LC0-d1) to general formula (LC0-d9) below are more preferable.

[Chem. 19]

(LC0-d1)
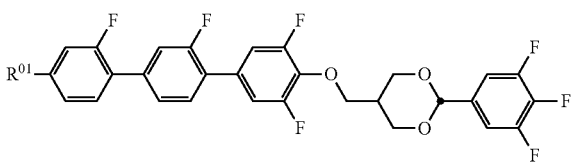

-continued (LC0-d2)
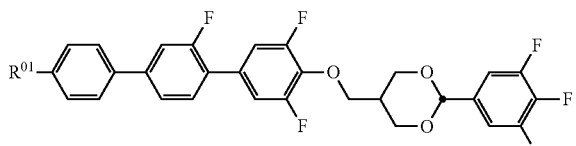

(LC0-d3)
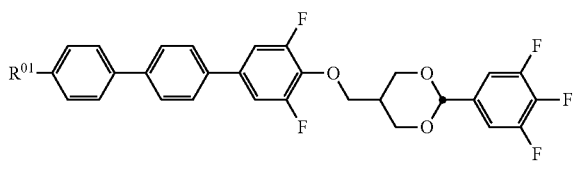

(LC0-d4)
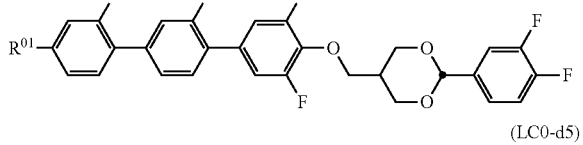

(LC0-d5)
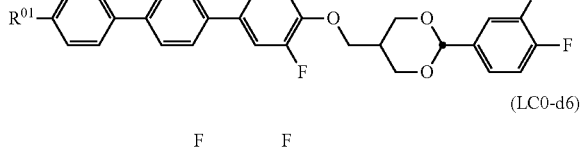

(LC0-d6)
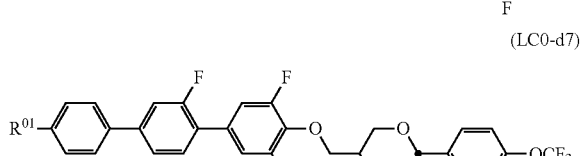

(LC0-d7)
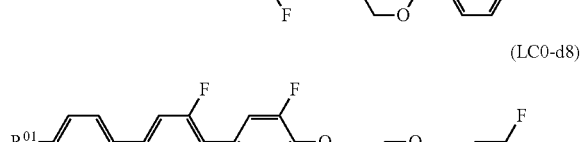

(LC0-d8)
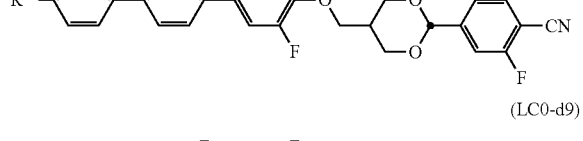

(LC0-d9)
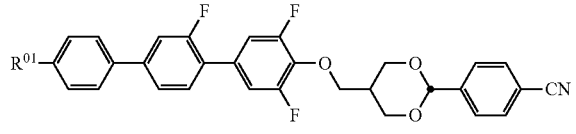

(In the formulae, $R^{01}$ is the same as $R^{01}$ in general formula (LC0).)

As the compound represented by general formula (LC0-e), compounds represented by general formula (LC0-e1) to general formula (LC0-e8) below are more preferable and compounds represented by general formula (LC0-e1) and general formula (LC0-e8) are yet more preferable.

[Chem. 20]
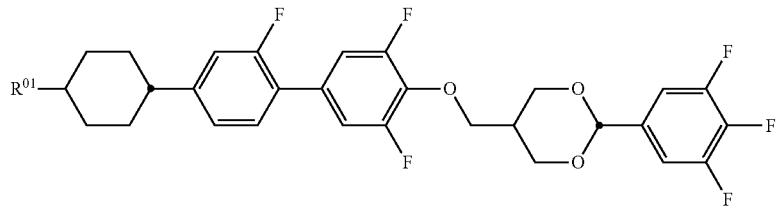
(LC0-e1)
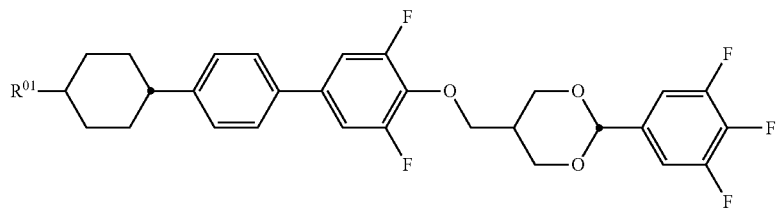
(LC0-e2)
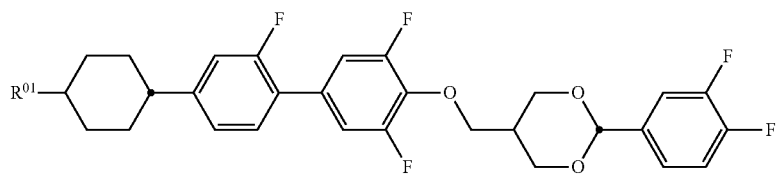
(LC0-e3)
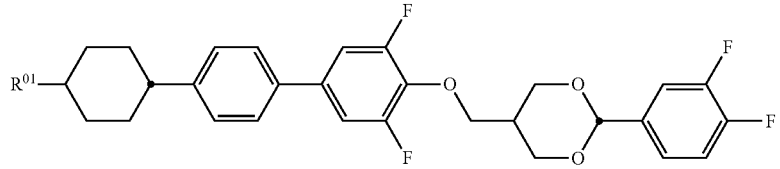
(LC0-e4)
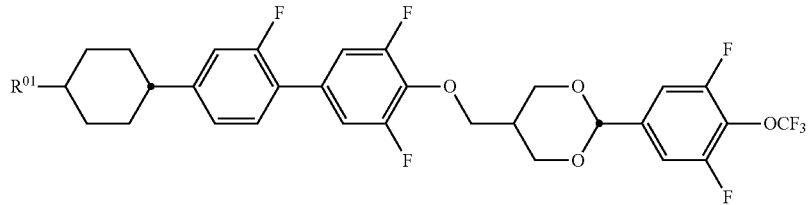
(LC0-e5)
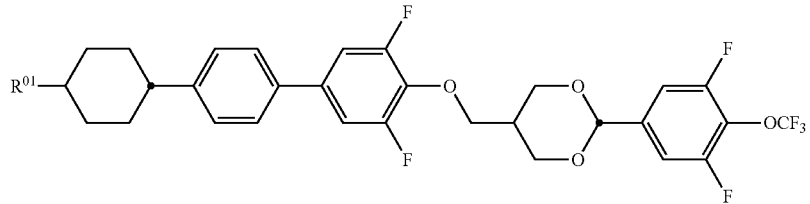
(LC0-e6)
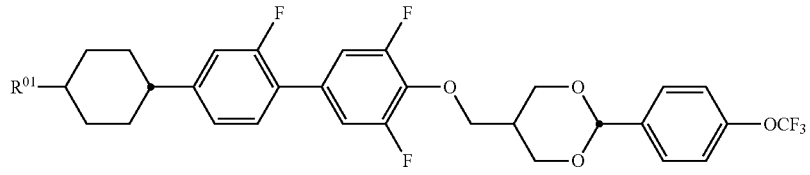
(LC0-e7)

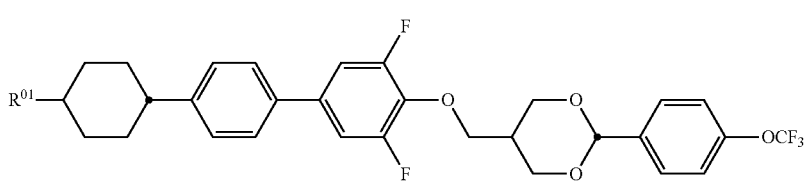

(In the formulae, $R^{01}$ is the same as $R^{01}$ in general formula (LC0).)

As the compound represented by general formula (LC0-f), compounds represented by general formula (LC0-f1) to general formula (LC0-f6) below are more preferable and a compound represented by general formula (LC0-f2) is yet more preferable.

[Chem. 21]

(LC0-f1)

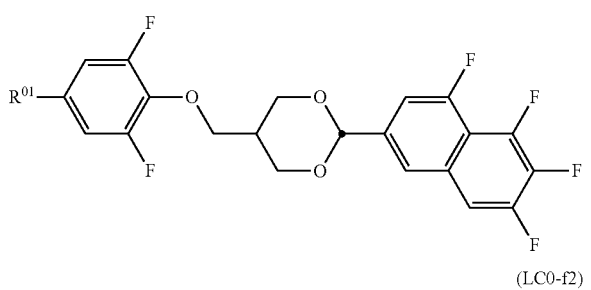

(LC0-f2)

(LC0-f3)

(LC0-f4)

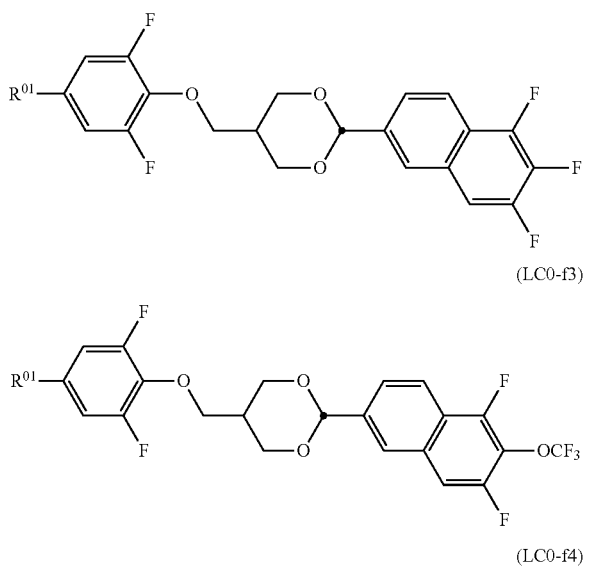

(LC0-e8)

-continued (LC0-f5)

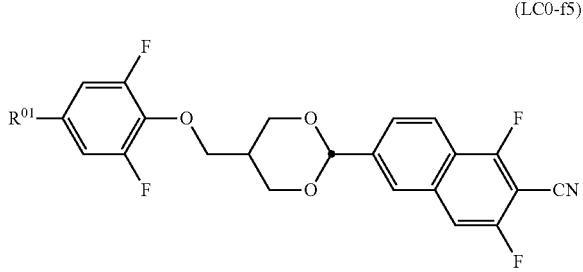

(LC0-f6)

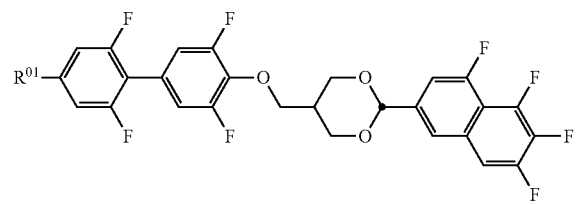

(In the formula, $R^{01}$ is the same as $R^{01}$ in general formula (LC0).)

As the compound represented by general formula (LC0-g), compounds represented by general formula (LC0-g1) to general formula (LC0-g12) below are more preferable.

[Chem. 22]

(LC0-g1)

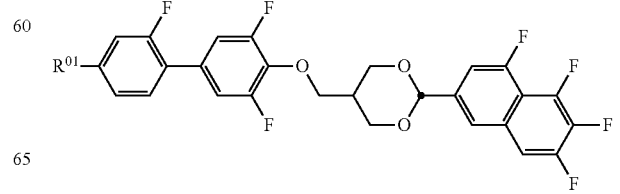

(LC0-g2)

(LC0-g3)
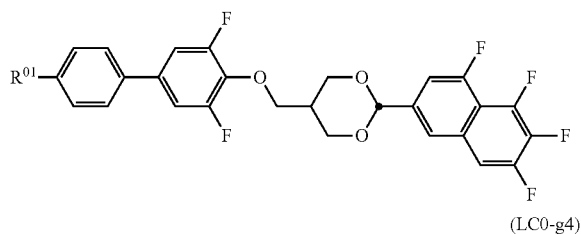
(LC0-g4)
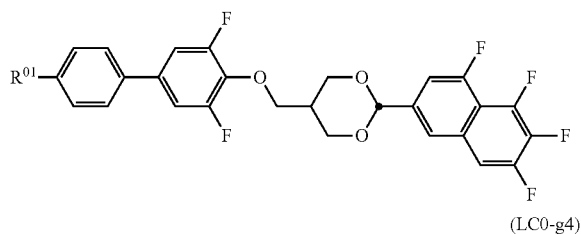
(LC0-g5)
(LC0-g6)
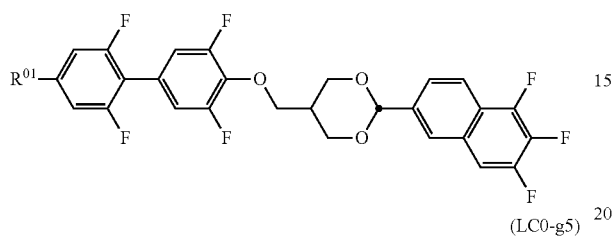
[Chem. 23]
(LC0-g7)
(LC0-g8)
(LC0-g9)
(LC0-g10)
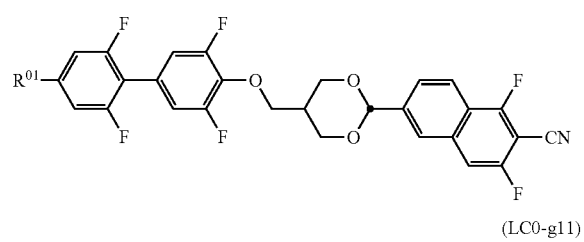
(LC0-g11)
(LC0-g12)
(In the formulae, $R^{01}$ is the same as $R^{01}$ in general formula (LC0).)
As the compound represented by general formula (LC0-h), compounds represented by general formula (LC0-h1) to general formula (LC0-h4) below are more preferable.
[Chem. 24]
(LC0-h1)
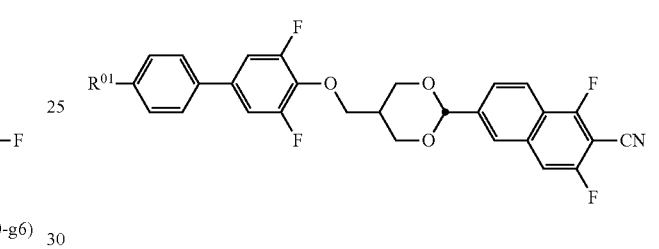
(LC0-h2)
(LC0-h3)

-continued (LC0-h4)

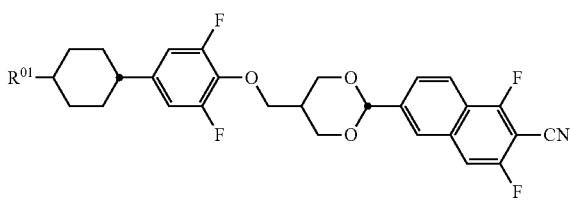

(In the formulae, $R^{01}$ is the same as $R^{01}$ in general formula (LC0).)

As the compound represented by general formula (LC0-i), compounds represented by general formula (LC0-i1) to general formula (LC0-i6) below are more preferable.

[Chem. 25]

(LC0-i1)

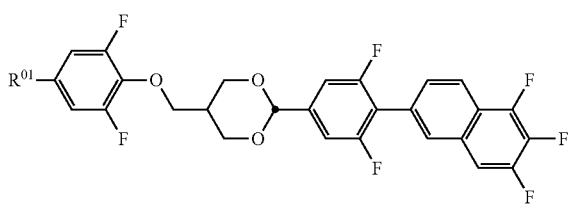

(LC0-i2)

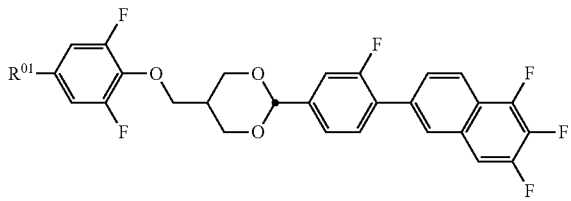

(LC0-i3)

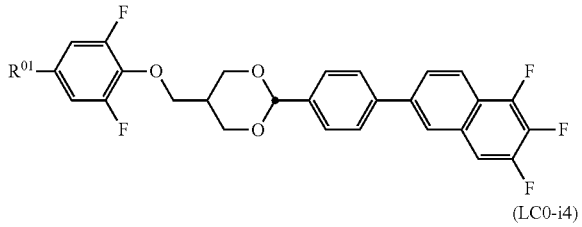

(LC0-i4)

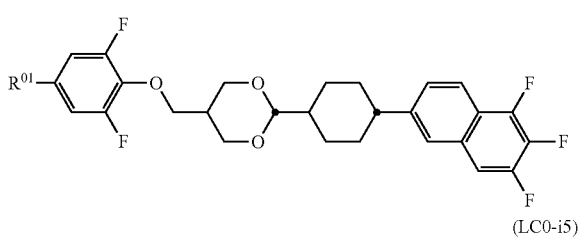

(LC0-i5)

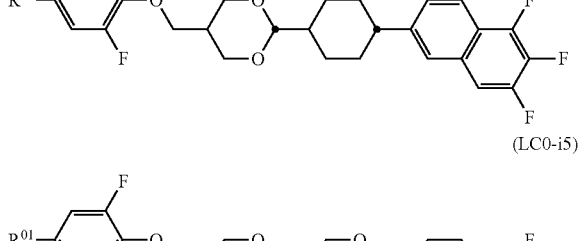

(LC0-i6)

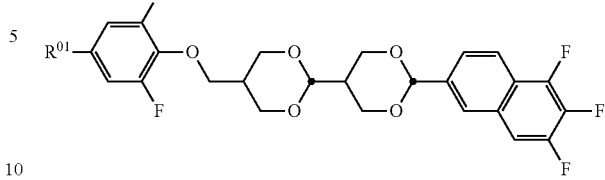

(In the formulae, $R^{01}$ is the same as $R^{01}$ in general formula (LC0).)

When the amount of the compound represented by general formula (LC0) contained in the liquid crystal composition of the present invention is small, the effects thereof do not appear. Thus, the lower limit of the amount in the composition is preferably 0.1% by mass or more (hereinafter, % for the amount in the composition represents % by mass), preferably 0.3% or more, preferably 0.5% or more, preferably 0.8% or more, preferably 1% or more, preferably 2% or more, preferably 3% or more, preferably 4% or more, preferably 5% or more, preferably 6% or more, preferably 7% or more, preferably 8% or more, preferably 9% or more, preferably 10% or more, preferably 13% or more, preferably 15% or more, preferably 18% or more, and preferably 20% or more. Since problems such as precipitation occur at a large amount, the upper limit is 80% or less, preferably 70% or less, preferably 60% or less, preferably 55% or less, preferably 50% or less, preferably 48% or less, preferably 45% or less, preferably 43% or less, preferably 40% or less, preferably 38% or less, preferably 37% or less, preferably 35% or less, preferably 32% or less, preferably 30% or less, preferably 28% or less, preferably 25% or less, preferably 23% or less, and preferably 20% or less. The compounds represented by general formula (1) may be used alone or in combination of two or more.

In general formula (LC1):

[Chem. 26]

$$R^{11}{-}(A^{11}{-}Z^{11}{)}_{m11}A^{12}{-}Z^{12}{-}A^{13}{-}R^{12}$$ (LC1)

$R^{11}$ and $R^{12}$ each independently represent an alkyl group having 1 to 15 carbon atoms, one or more —$CH_2$— in the alkyl group may each be substituted with —O—, —CH=CH—, —CO—, —OCO—, —COO—, —C≡C—, —$CF_2$O—, or —O$CF_2$— so long as oxygen atoms are not directly adjacent to each other, and one or more hydrogen atoms in the alkyl group may be substituted with a halogen. However, $R^{11}$ and $R^{12}$ preferably each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms and are preferably linear. When $R^{11}$ and $R^{12}$ each represent an alkenyl group, the alkenyl group is preferably one selected from formula (R1) to formula (R5).

[Chem. 27]

(R1)

(R2)

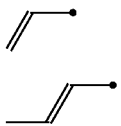

-continued

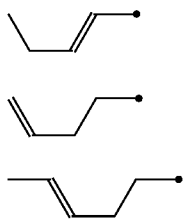

(R3)

(R4)

(R5)

(In each formula, the black dot represents a linking point to a ring.)

When $R^{11}$ and $R^{12}$ each represent an alkenyloxy group, an alkenyl group having 2 to 6 carbon atoms is preferable in order to decrease viscosity and preferably selection is made from the groups represented by formula (R6):

[Chem. 28]

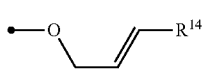

(R6)

(In the formula, $R^{14}$ represents a hydrogen atom or an alkyl group having 1 to 3 carbon atoms, one —CH$_2$— or two or more non-adjacent —CH$_2$— present in these groups may each be substituted with —O—, —COO—, —OCO—, or —CO—, a hydrogen atom present in these groups may be substituted with a fluorine atom, and the black dot in the formula represents a linking point to a ring.) More preferably, $R^{14}$ represents a hydrogen atom or a methyl group.

The combination of $R^{11}$ and $R^{12}$ is not particularly limited. Both may represent an alkyl group, one may represent an alkyl group while the other may represent an alkenyl group, one may represent an alkyl group while the other may represent an alkoxy group, or one may represent an alkyl group while the other may represent an alkenyloxy group.

$A^{11}$ to $A^{13}$ preferably each independently represent one of the following structures:

[Chem. 29]

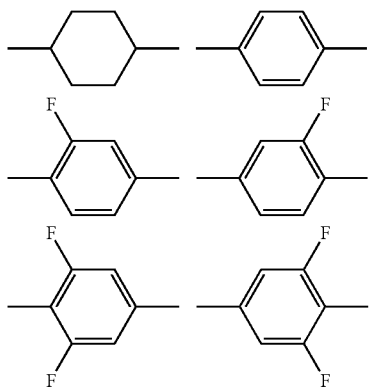

$A^{11}$ to $A^{13}$ each independently represent one of the following structures:

[Chem. 30]

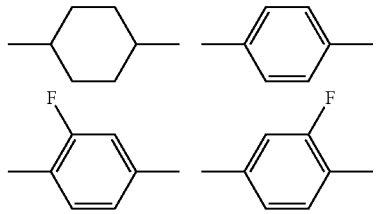

which are more preferable.

$Z^{11}$ and $Z^{12}$ each independently represent a single bond, —CH=CH—, —C≡C—, —CH$_2$CH$_2$—, —(CH$_2$)$_4$—, —OCH$_2$—, —CH$_2$O—, —OCF$_2$—, or —CF$_2$O—, more preferably a single bond, —CH$_2$CH$_2$—, —OCF$_2$—, or —CF$_2$O—, and yet more preferably a single bond.

Preferably, $m^{11}$ represents an integer of 1 or 2. When two or more $A^{11}$ and/or $Z^{11}$ are present, they may be the same or different.

The compound represented by general formula (LC1) is preferably selected from the compounds represented by general formula (LC1-1) to general formula (LC1-39) below. The liquid crystal composition according to the present invention preferably contains, as a compound represented by general formula (LC1), at least one selected from the compounds represented by (LC1-1) to (LC1-26), more preferably contains at least one compound represented by (LC1-1) to (LC1-5), (LC1-7), (LC1-15), (LC1-16), (LC1-18), (LC1-21), and (LC1-38):

[Chem. 31]

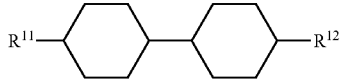

(LC1-1)

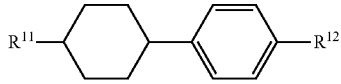

(LC1-2)

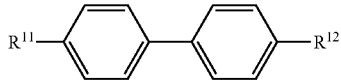

(LC1-3)

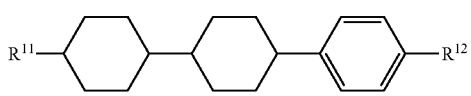

(LC1-4)

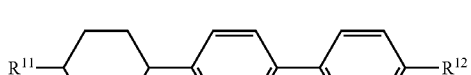

(LC1-5)

(LC1-6)

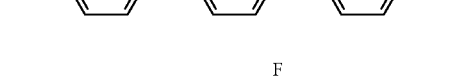

(LC1-7)

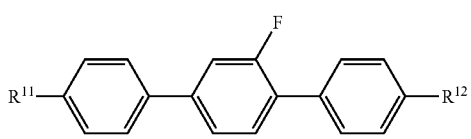

(LC1-8)
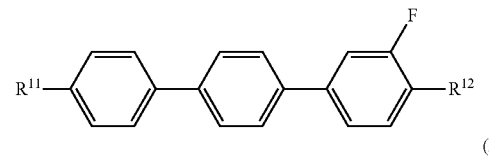
(LC1-9)
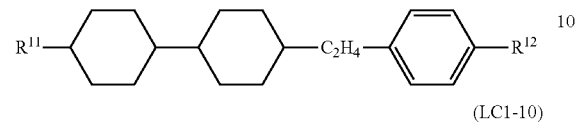
(LC1-10)
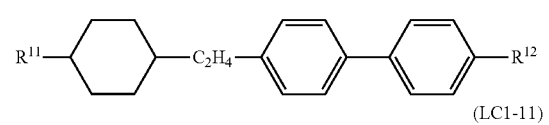
(LC1-11)
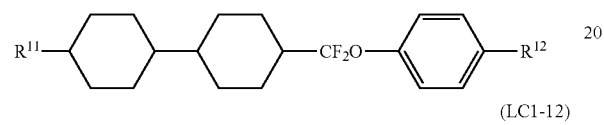
(LC1-12)
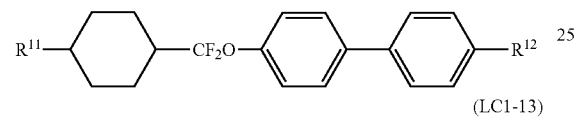
(LC1-13)
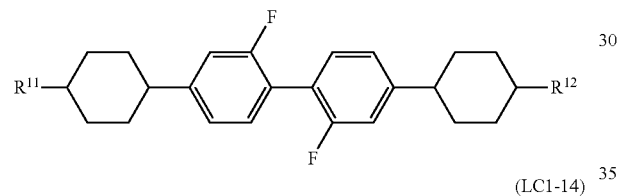
[Chem. 32]
(LC1-14)
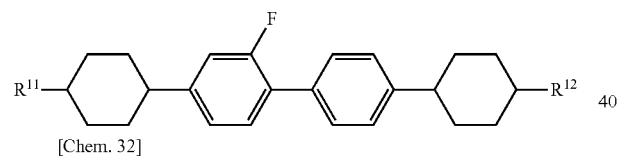
(LC1-15)
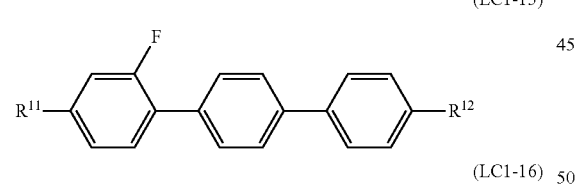
(LC1-16)
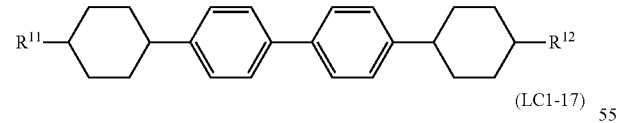
(LC1-17)
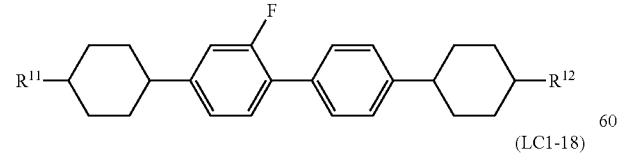
(LC1-18)
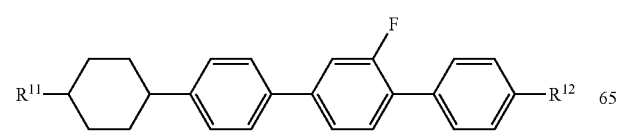
(LC1-19)
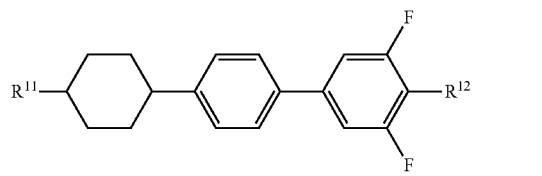
(LC1-20)
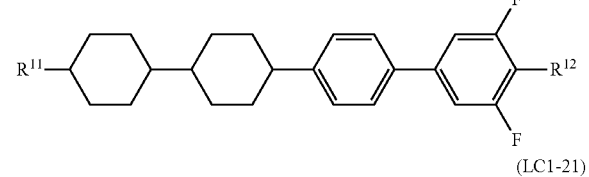
(LC1-21)
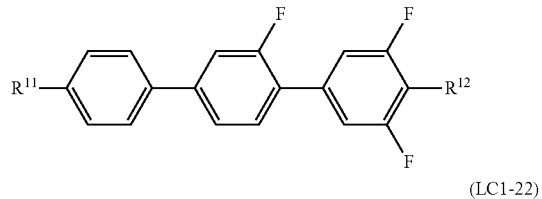
(LC1-22)
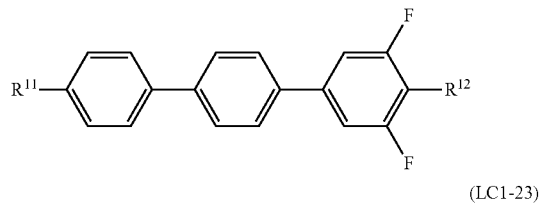
(LC1-23)
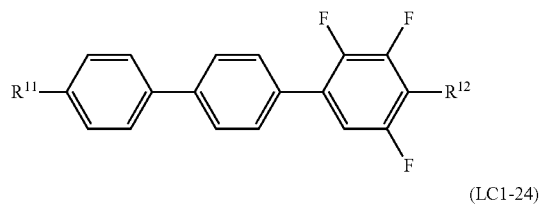
(LC1-24)
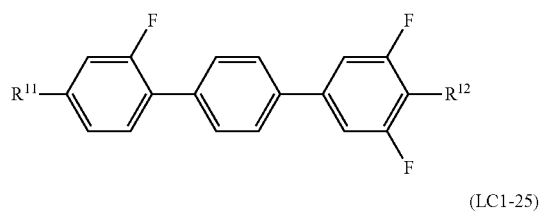
(LC1-25)
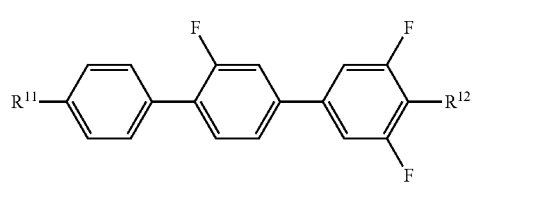
(LC1-26)
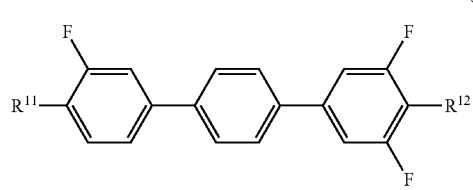

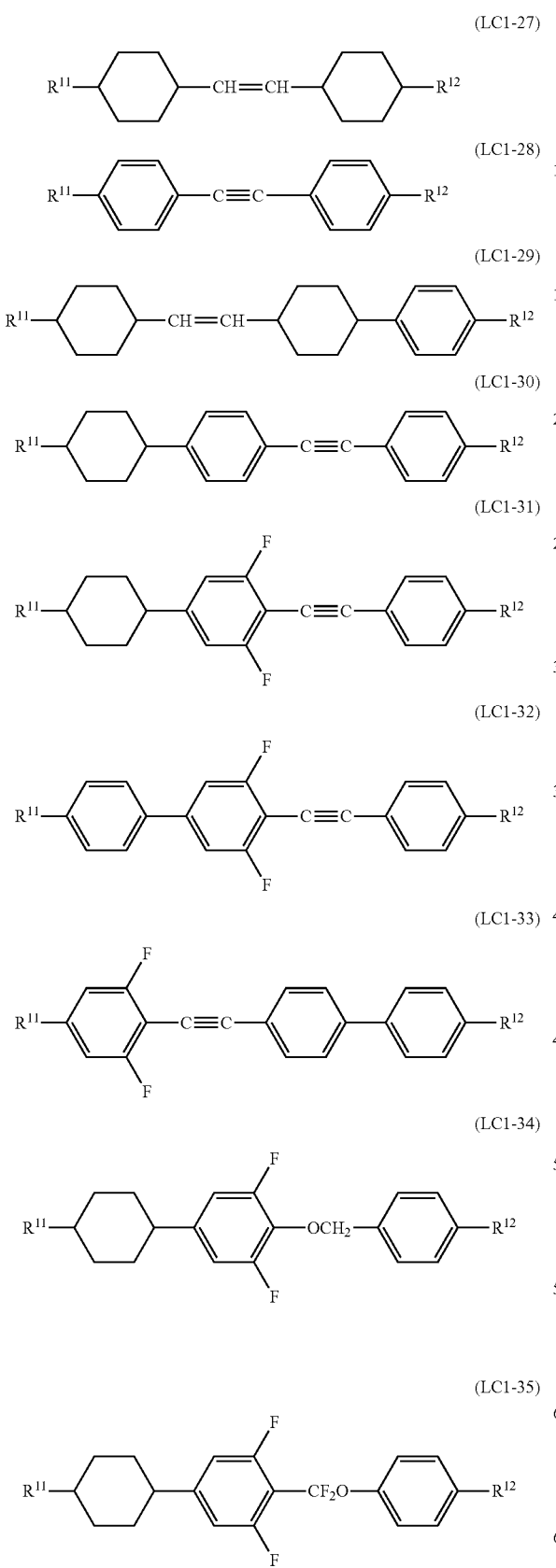
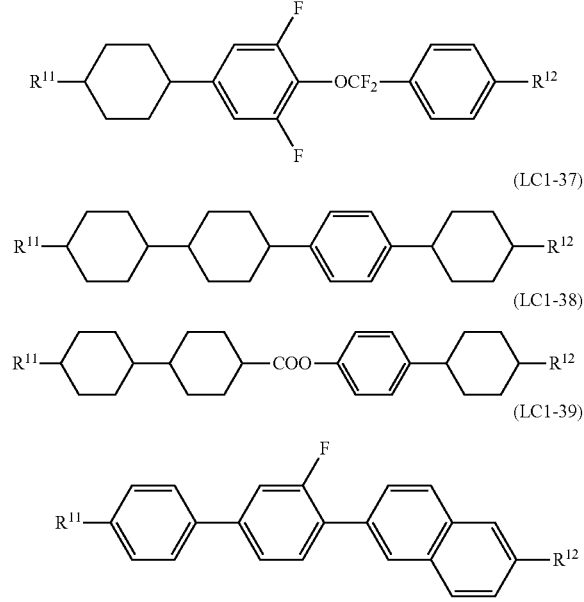
(In the formulae, $R^{11}$ and $R^{12}$ are respectively the same as $R^{11}$ and $R^{12}$ in general formula (LC1).)
As the compound represented by general formula (LC1), at least one selected from the group consisting of the following compounds is more preferably contained in an amount of 70% by mass at most.
[Chem. 34]
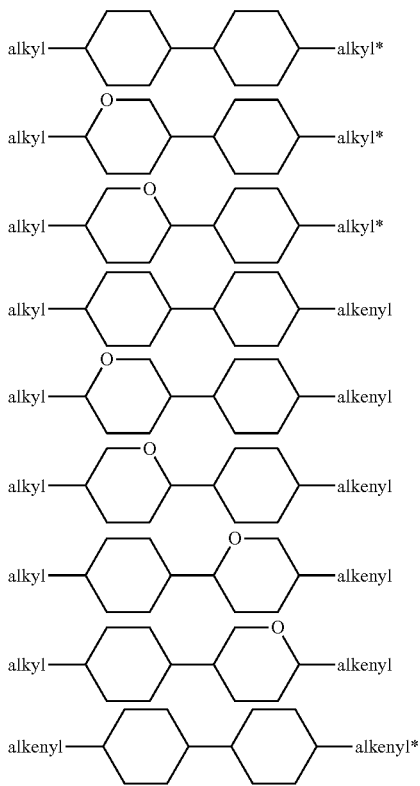

-continued

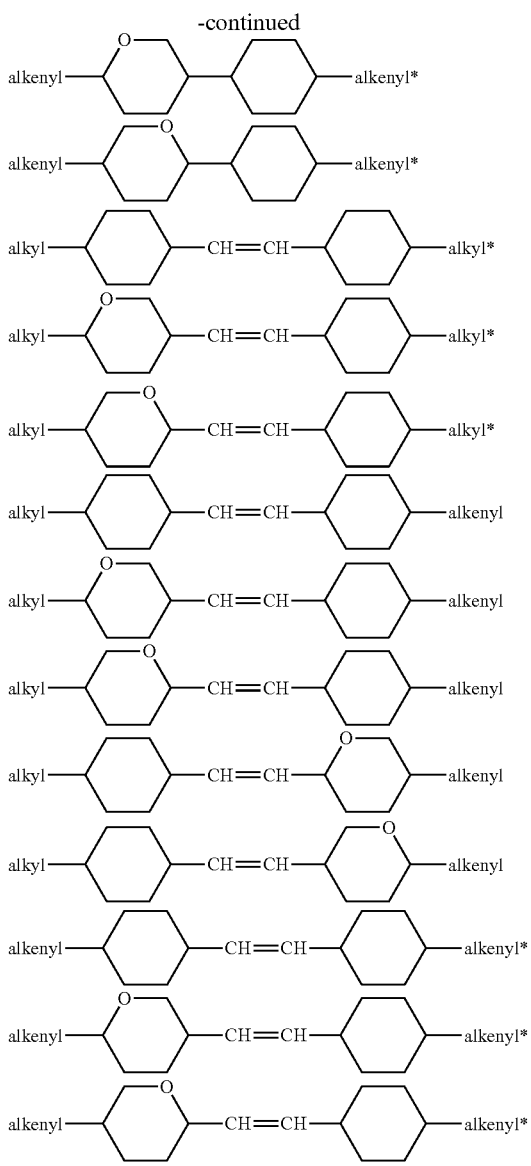

(In the formulae, alkyl and alkyl* each independently represent an alkyl or alkoxy group having 1 to 5 carbon atoms and alkenyl and alkenyl* each independently represent an alkenyl or alkenyloxy group having 2 to 5 carbon atoms.)

In the liquid crystal composition according to the present invention, the lower limit of the amount of the compound represented by general formula (LC1) is preferably 1% or more, preferably 5% or more, preferably 10% or more, preferably 15% or more, preferably 18% or more, preferably 20% or more, preferably 25% or more, preferably 28% or more, preferably 30% or more, preferably 33% or more, preferably 35% or more, preferably 38% or more, preferably 40% or more, preferably 43% or more, preferably 45% or more, preferably 48% or more, preferably 50% or more, preferably 53% or more, preferably 55% or more, preferably 58% or more, and preferably 60% or more. The upper limit is preferably 99% or less, preferably 98% or less, preferably 95% or less, preferably 93% or less, preferably 90% or less, preferably 87% or less, preferably 85% or less, preferably 83% or less, preferably 80% or less, preferably 88% or less, preferably 85% or less, preferably 83% or less, preferably 80% or less, preferably 78% or less, preferably 75% or less, preferably 73% or less, preferably 70% or less, preferably 68% or less, preferably 65% or less, preferably 63% or less, and preferably 60% or less. The compounds represented by general formula (1) can be used alone or in combination of two or more.

In the liquid crystal composition according to the present invention, the lower limit of the amount of the compounds represented by general formula (LC0) and general formula (LC1) contained is preferably 5% or more, preferably 10% or more, preferably 15% or more, preferably 20% or more, preferably 25% or more, preferably 30% or more, preferably 35% or more, preferably 40% or more, preferably 45% or more, preferably 50% or more, preferably 55% or more, preferably 60% or more, preferably 65% or more, preferably 70% or more, and preferably 75% or more. The upper limit is preferably 100% or less, preferably 95% or less, preferably 90% or less, preferably 85% or less, preferably 80% or less, preferably 75% or less, preferably 70% or less, preferably 65% or less, preferably 60% or less, preferably 55% or less, preferably 50% or less, preferably 40% or less, and preferably 30% or less.

Furthermore, the liquid crystal composition contains a compound represented by general formula (LC2):

[Chem. 35]

$$R^{21}-(A^{21}-Z^{21})_{m21}A^{22}-Z^{22}-B^{21} \qquad (LC2)$$

(In the formula, $R^{21}$ represents an alkyl group having 1 to 15 carbon atoms, one or more —$CH_2$— in the alkyl group may each be substituted with —O—, —CH=CH—, —CO—, —OCO—, —COO—, —C≡C—, —$CF_2$O—, or —O$CF_2$— so long as oxygen atoms are not directly adjacent to each other, one or more hydrogen atoms in the alkyl group may each be substituted with a halogen, $A^{21}$ and $A^{22}$ each independently represent a trans-1,4-cyclohexylene group, a 1,4-phenylene group, a 3-fluoro-1,4-phenylene group, a 3,5-difluoro-1,4-phenylene group, a 1,4-cyclohexenylene group, a tetrahydropyran-2,5-diyl group, a 1,3-dioxane-2,5-diyl group, a 1,4-bicyclo[2.2.2]octylene group, a naphthalene-2,6-diyl group, a decahydronaphthalene-2,6-diyl group, or a 1,2,3,4-tetrahydronaphthalene-2,6-diyl group, $B^{21}$ represents a structure selected from below:

[Chem. 36]

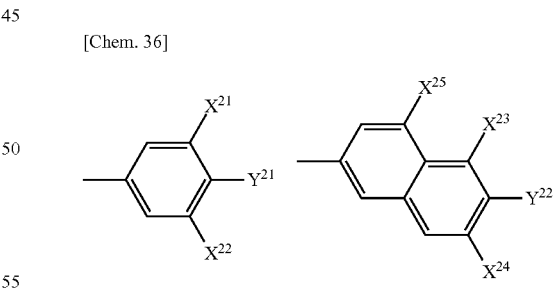

(In the structures, $X^{21}$ to $X^{25}$ each independently represent a hydrogen atom or a fluorine atom and $Y^{21}$ and $Y^{22}$ each independently represent a chlorine atom, a cyano group, a fluorine atom, —$CF_3$, —$OCF_3$, —$CF_2CF_3$, —$CHFCF_3$, —$OCF_2CF_3$, —$OCHFCF_3$, or —OCF=$CF_2$), $Z^{21}$ and $Z^{22}$ each independently represent a single bond, —CH=CH—, —C≡C—, —$CH_2CH_2$—, —$(CH_2)_4$—, —$OCH_2$—, —$CH_2O$—, —$OCF_2$—, or —$CF_2O$—, $m^{21}$ represents 0, 1, 2, or 3, and when two or more $A^{21}$ and/or $Z^{21}$ are present, they may be the same or different. However, compounds represented by general formula (LC0) are excluded.)

$R^{21}$ preferably represents an alkyl group having 1 to 8 carbon atoms, an alkenyl group having 2 to 8 carbon atoms, or an alkoxy group having 1 to 8 carbon atoms and is preferably linear. When $R^{21}$ represents an alkenyl group, it is preferably selected from groups represented by formula (R1) to formula (R5).

[Chem. 37]

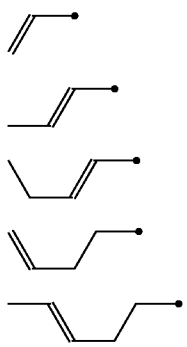

(R1)
(R2)
(R3)
(R4)
(R5)

(In each formula, the black dot represents a linking point to a ring.)

$A^{21}$ and $A^{22}$ preferably each independently represent a trans-1,4-cyclohexylene group, a 1,4-phenylene group, a 3-fluoro-1,4-phenylene group, a 3,5-difluoro-1,4-phenylene group, or a tetrahydropyran group.

In order to decrease viscosity, $B^{21}$ preferably represents the following:

[Chem. 38]

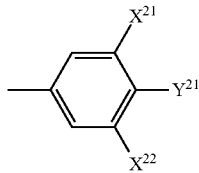

In order to increase $T_{\to i}$,

[Chem. 39]

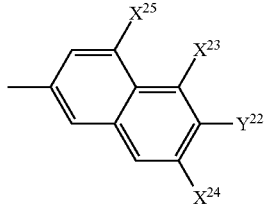

is preferable.

$X^{21}$, $X^{22}$, $X^{23}$, $X^{Z4}$, and $X^{25}$ preferably each independently represent a hydrogen atom in order to decrease viscosity and increase $T_{\to i}$, and preferably each independently represent a fluorine atom in order to increase $\Delta\epsilon$.

When $X^{21}$ and $X^{22}$ each independently represent a fluorine atom or a hydrogen atom, the following is preferred in order to increase $\Delta\epsilon$:

[Chem. 40]

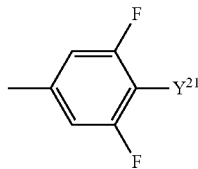

In order to decrease viscosity,

[Chem. 41]

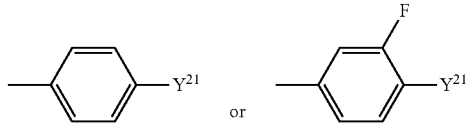

or is preferable.

When $X^{23}$ to $X^{25}$ each independently represent a fluorine atom or a hydrogen atom, a choice is preferably made from the following partial structures:

[Chem. 42]

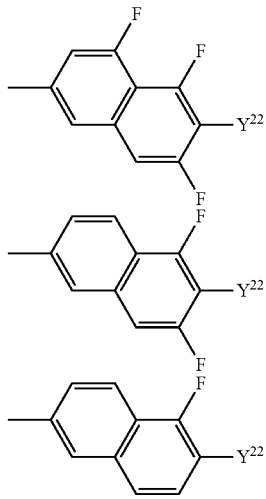

$Y^{21}$ and $Y^{=22}$ are particularly preferably a combination selected from a fluorine atom, —$CF_3$, and —$OCF_3$ since the nematic phase lower limit temperature is improved and the low-temperature operation and storage property of the liquid crystal composition are enhanced.

$B^{21}$ is particularly preferably selected from the following partial structures:

[Chem. 43]

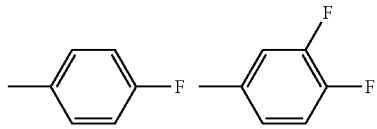

-continued

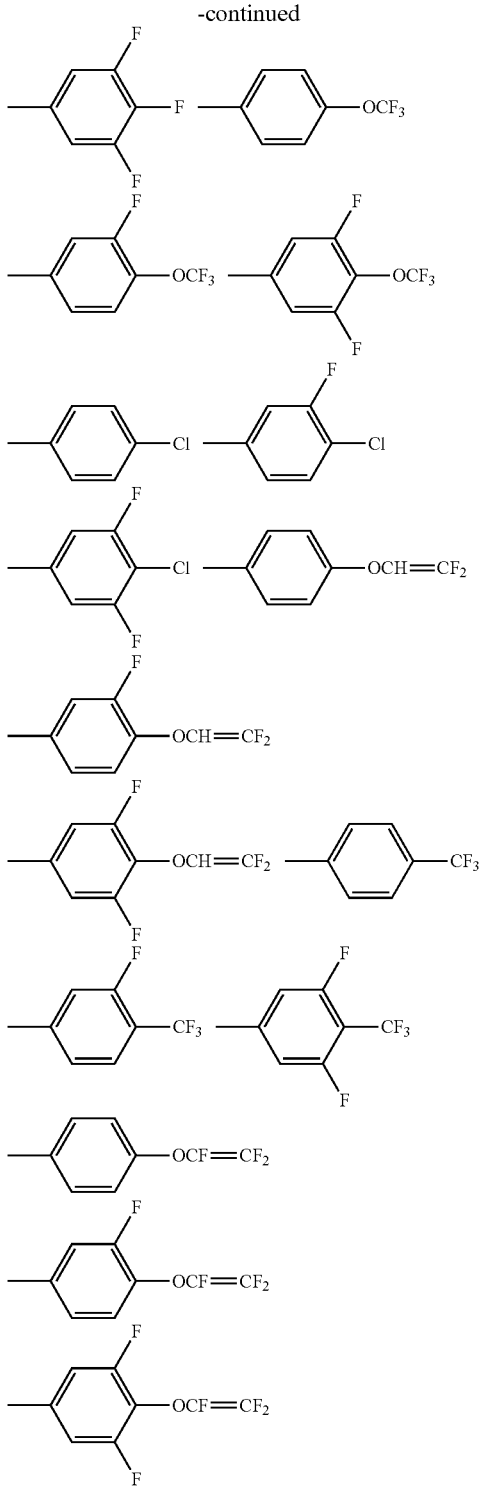

$Z^{21}$ and $Z^{22}$ preferably each independently represent a single bond, —CH=CH—, —C≡C—, —CH$_2$CH$_2$—, —(CH$_2$)$_4$—, —OCH$_2$—, —CH$_2$O—, —OCF$_2$—, or —CF$_2$O— and more preferably each independently represent a single bond, —OCH$_2$—, —CH$_2$O—, —OCF$_2$—, or —CF$_2$O—.

Preferably, m$^{21}$ represents an integer of 0 to 2. When two or more A$^{21}$ and/or Z$^{21}$ are present, they may be the same or different.

As the compound represented by general formula (LC2), at least one compound represented by general formula (LC2-a) is preferably contained:

[Chem. 44]

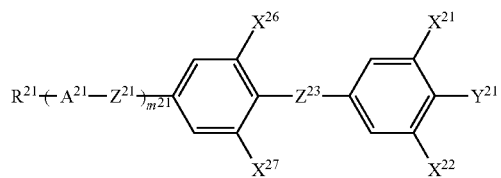

(LC2-a)

(In the formula, X$^{26}$ and X$^{27}$ each independently represent a hydrogen atom or a fluorine atom, Z$^{23}$ represents —OCH$_2$—, —CH$_2$O—, —OCF$_2$—, or —CF$_2$O—, and R$^{21}$, A$^{21}$, Z$^{21}$, X$^{21}$, X$^{22}$, Y$^{21}$, and m$^{21}$ are respectively the same as R$^{21}$, A$^{21}$, Z$^{21}$, X$^{21}$, X$^{22}$, Y$^{21}$, and m$^{21}$ in general formula (LC2).)

X$^{26}$ and X$^{27}$ each preferably represent a fluorine atom, at least one of X$^{026}$ and X$^{27}$ preferably represents a fluorine atom, and X$^{26}$ and X$^{27}$ more preferably both represent a fluorine atom.

The compound represented by general formula (LC2-a) preferably contains at least one compound selected from the compounds represented by general formula (LC2-a1) to general formula (LC2-a11):

[Chem. 45]

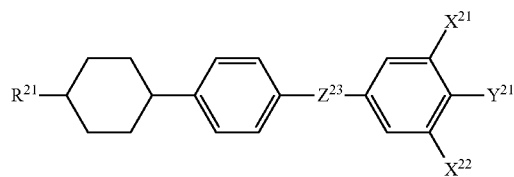

(LC2-a1)

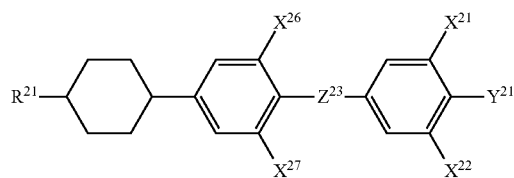

(LC2-a2)

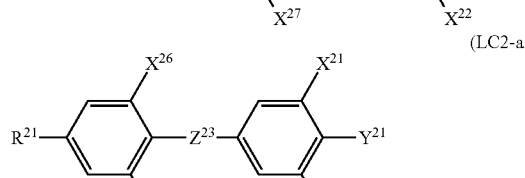

(LC2-a3)

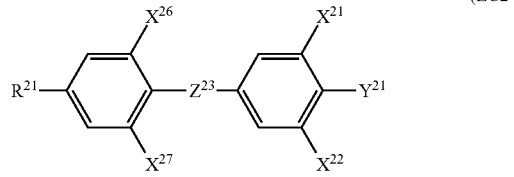

(LC2-a4)

(LC2-a5)
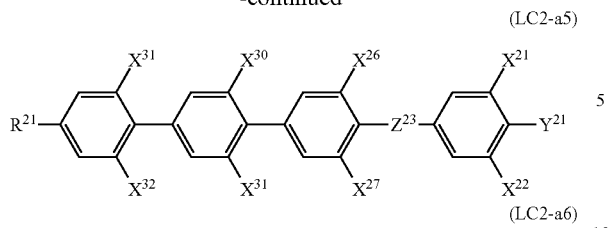

(LC2-a6)
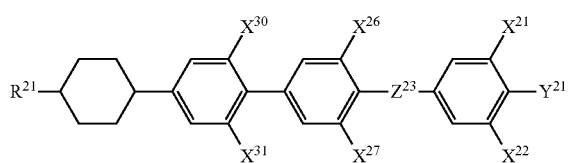

[Chem. 46]

(LC2-a7)
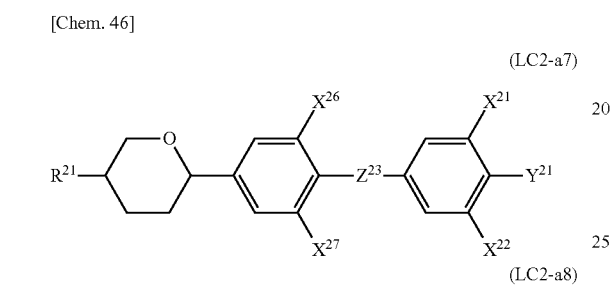

(LC2-a8)

(LC2-a9)
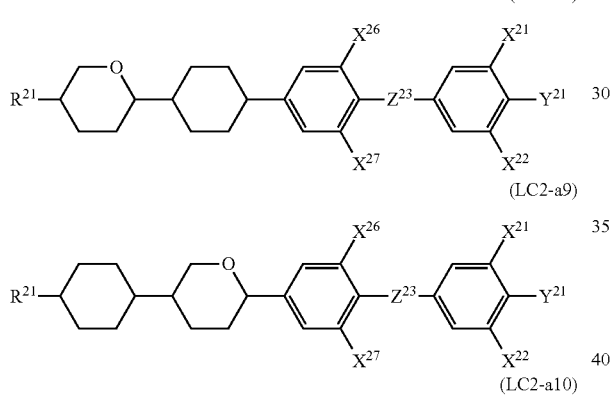

(LC2-a10)

(LC2-a11)
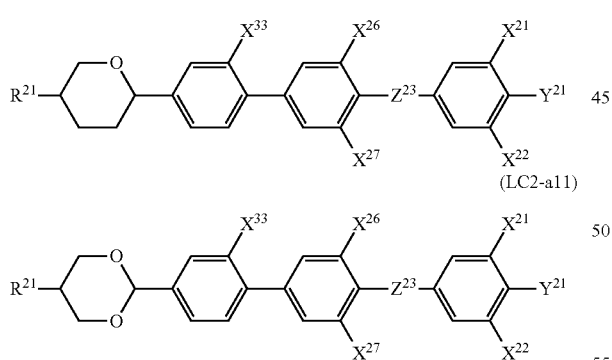

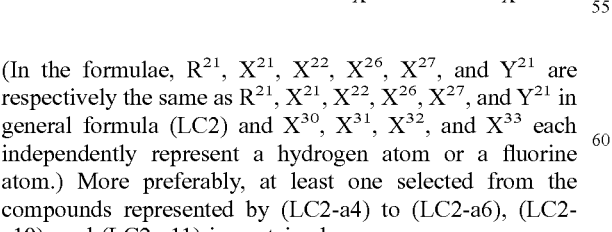

(In the formulae, $R^{21}$, $X^{21}$, $X^{22}$, $X^{26}$, $X^{27}$, and $Y^{21}$ are respectively the same as $R^{21}$, $X^{21}$, $X^{22}$, $X^{26}$, $X^{27}$, and $Y^{21}$ in general formula (LC2) and $X^{30}$, $X^{31}$, $X^{32}$, and $X^{33}$ each independently represent a hydrogen atom or a fluorine atom.) More preferably, at least one selected from the compounds represented by (LC2-a4) to (LC2-a6), (LC2-a10), and (LC2-a11) is contained.

As the compound represented by general formula (LC2), at least one compound represented by general formula (LC2-b) is preferably contained:

[Chem. 47]

(LC2-b)
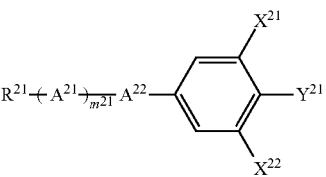

(In the formula, $R^{21}$, $A^{21}$, $A^{22}$, $X^{21}$, $X^{22}$, $Y^{21}$, and $m^{21}$ are respectively the same as $R^{21}$, $A^{21}$, $A^{22}$, $X^{21}$, $X^{22}$, $Y^{21}$, and $m^{21}$ in general formula (LC2).)

The compound represented by general formula (LC2-b) preferably contains at least one selected from the compounds represented by general formula (LC2-b1) to general formula (LC2-b21):

[Chem. 48]

(LC2-b1)
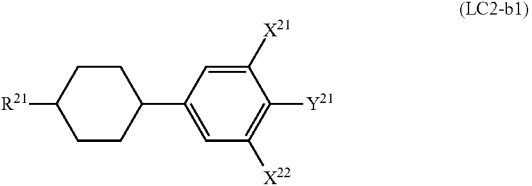

(LC2-b2)
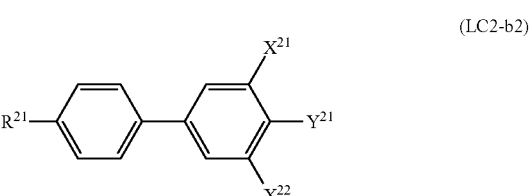

(LC2-b3)
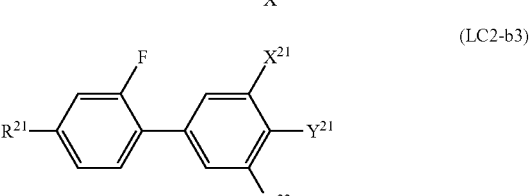

(LC2-b4)
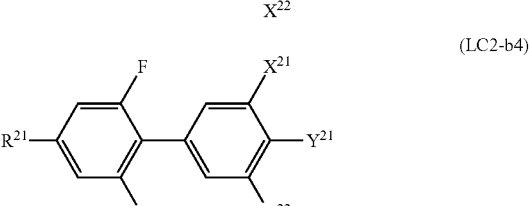

[Chem. 49]

(LC2-b5)
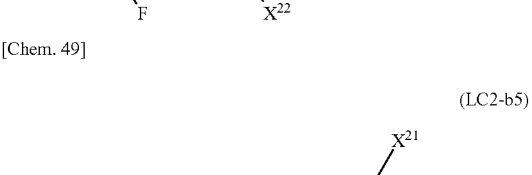

(LC2-b6)
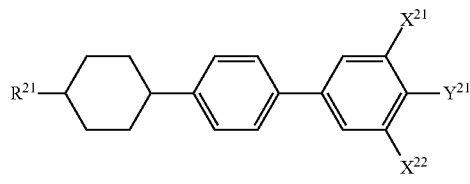
(LC2-b7)
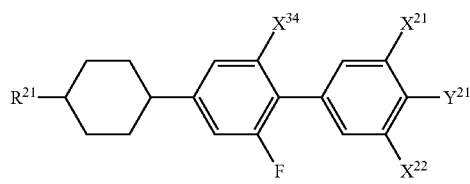
(LC2-b8)
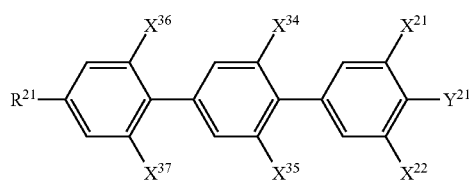
(LC2-b9)
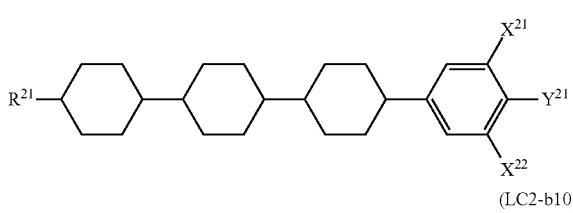
(LC2-b10)
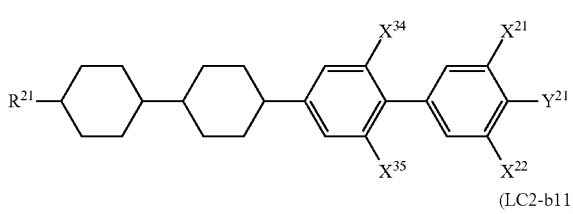
(LC2-b11)
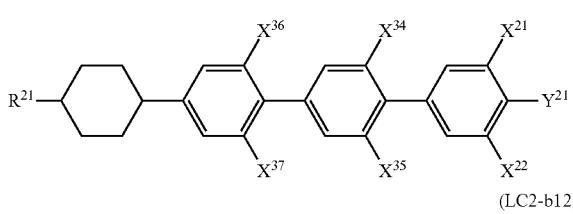
(LC2-b12)
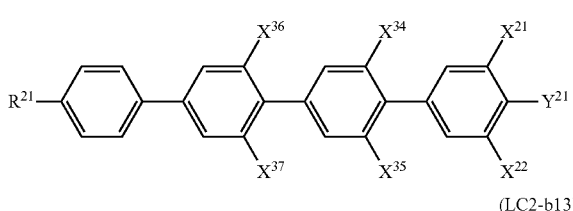
(LC2-b13)
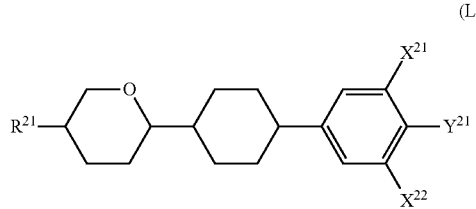
(LC2-b14)
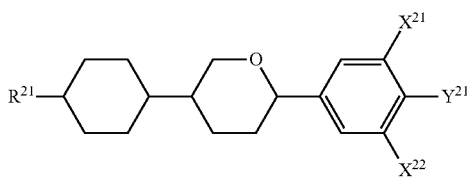
(LC2-b15)
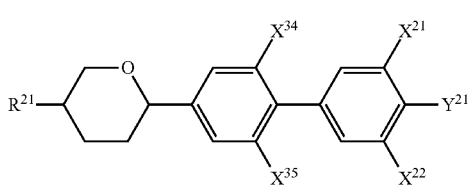
(LC2-b16)
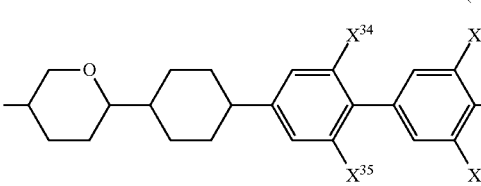
(LC2-b17)
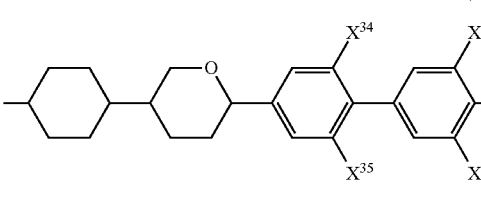
(LC2-b18)
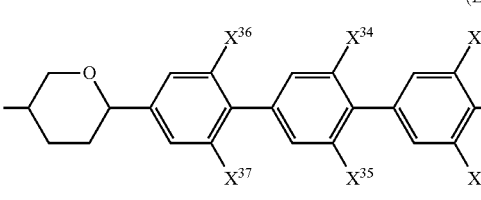
[Chem. 50]
(LC2-b19)
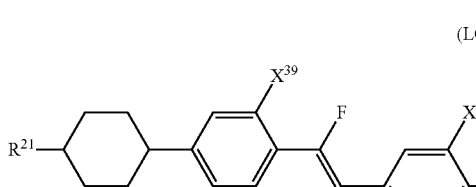
(LC2-b20)
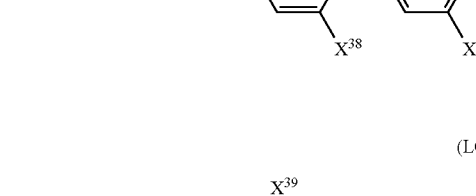
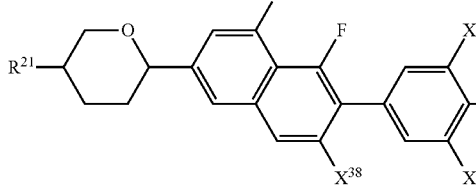

(LC2-b21)

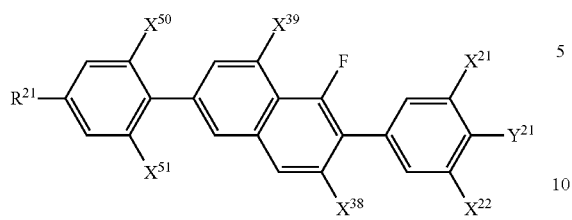

(In the formula, $X^{34}$, $X^{35}$, $X^{36}$, $X^{37}$, $X^{38}$, $X^{39}$, $X^{50}$, and $X^{51}$ each independently represent a hydrogen atom or a fluorine atom and $R^{21}$, $X^{21}$, $X^{22}$, and $Y^{21}$ are respectively the same as $R^{21}$, $X^{21}$, $X^{22}$, and $Y^{21}$ in general formula (LC2-b).) More preferably, at least one selected from the compounds represented by general formula (LC2-b5) to general formula (LC2-b8), general formula (LC2-b10) to general formula (LC2-b12), and general formula (LC2-b18) is preferably contained.

As the compound represented by general formula (LC2) other than those represented by general formula (LC2-a) and general formula (LC2-b), the following compounds are preferably contained.

[Chem. 51]

(LC2-1)

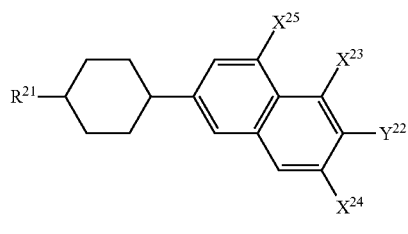

(LC2-2)

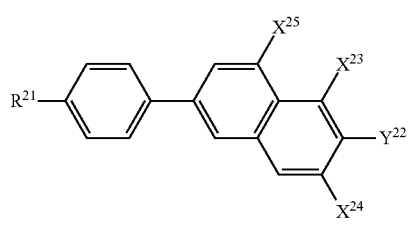

(LC2-3)

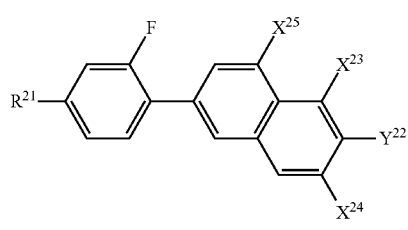

(LC2-4)

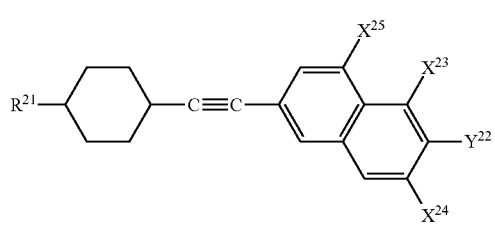

(LC2-5)

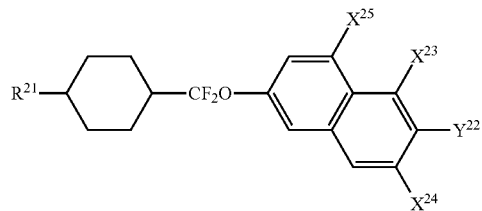

(LC2-6)

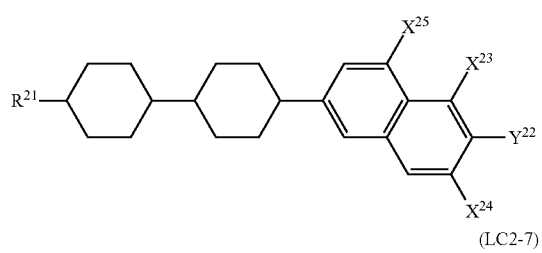

(LC2-7)

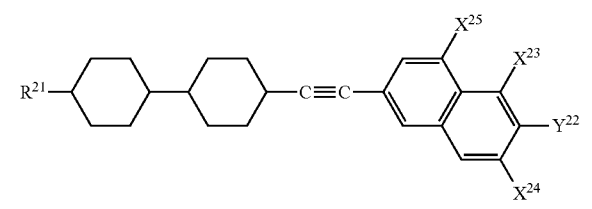

(LC2-8)

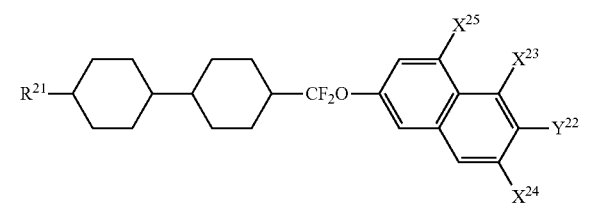

(LC2-9)

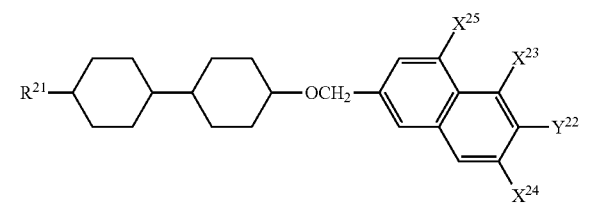

[Chem. 52]

(LC2-10)

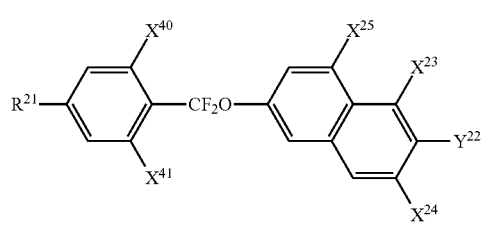

(LC2-11)
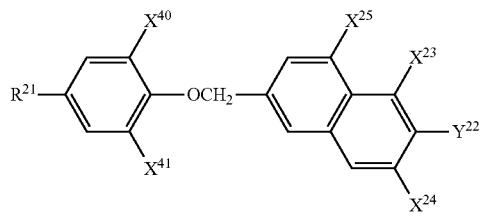

(LC2-12)
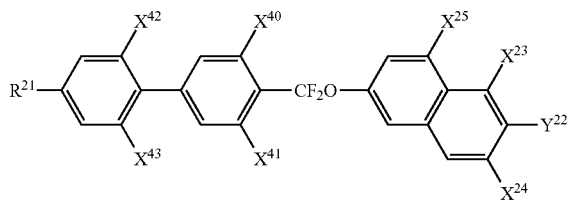

(LC2-13)
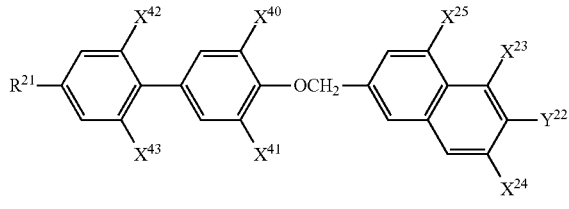

(LC2-14)
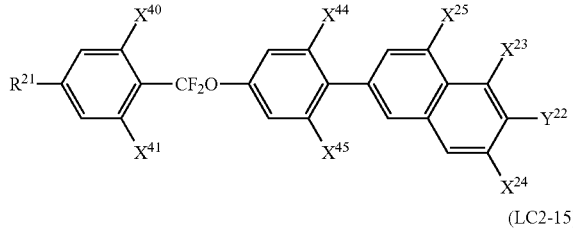

(LC2-15)
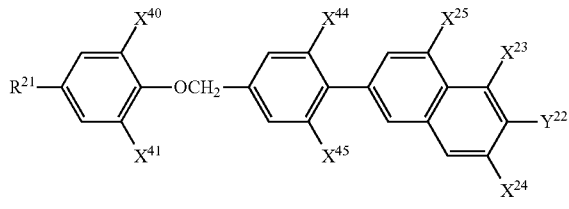

(LC2-16)
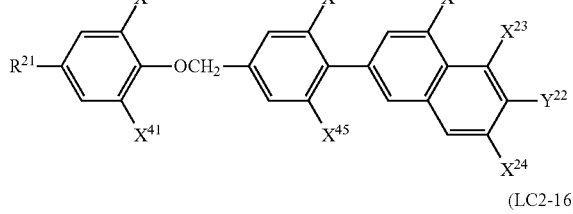

(LC2-17)
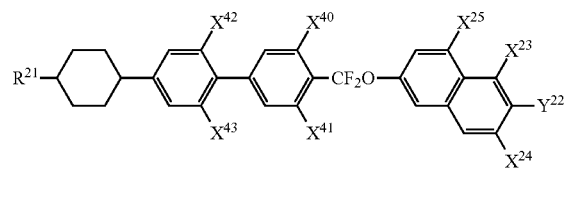

(LC2-18)
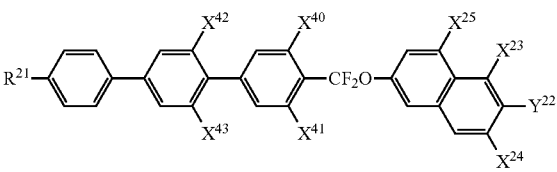

(LC2-19)
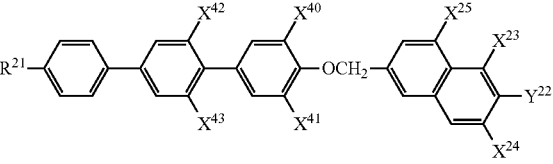

(In the formulae, $X^{40}$, $X^{41}$, $X^{42}$, $X^{43}$, $X^{44}$, and $X^{45}$ each independently represent a hydrogen atom or a fluorine atom and $R^{21}$, $X^{23}$, $X^{24}$, $X^{25}$, and $Y^{22}$ are respectively the same as $R^{21}$, $X^{23}$, $X^{24}$, $X^{25}$, and $Y^{22}$ in general formula (LC2).)

In the liquid crystal composition according to the present invention, the lower limit of the amount of the compound represented by general formula (LC2) contained is preferably 1% or more, preferably 3% or more, preferably 5% or more, preferably 8% or more, preferably 10% or more, and preferably 15% or more. The upper limit is preferably 50% or less, preferably 45% or less, preferably 40% or less, preferably 35% or less, preferably 30% or less, preferably 25% or less, and preferably 20% or less. The compounds represented by general formula (1) may be used alone or in combination of two or more.

The liquid crystal composition according to the present invention preferably has a viscosity η at 20° C. of 20 mPa·s or less.

The liquid crystal composition according to the present invention can contain at least one optically active compound. Any optically active compound capable of twisting and aligning liquid crystal molecules can be used. Since twisting is usually dependent on the temperature, two or more optically active compounds can be used to obtain a desired temperature dependence. In order to avoid adverse effects on the nematic liquid crystal phase temperature range and viscosity, it is preferable to chose and use an optically active compound having a strong twisting effect. As such an optically active compound, liquid crystals such as cholesteric nonanate and compounds represented by general formula (Ch-1) to general formula (Ch-6) below are preferably contained.

[Chem. 53]

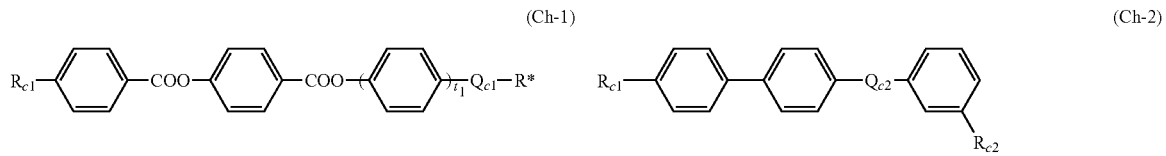
(Ch-1) (Ch-2)

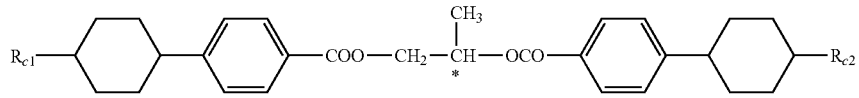
(Ch-3)

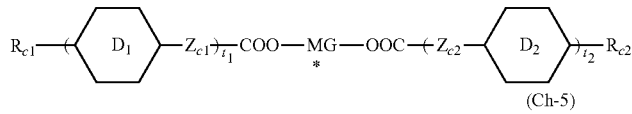
(Ch-4)

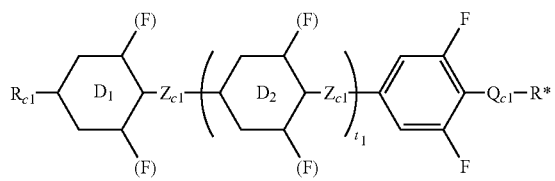 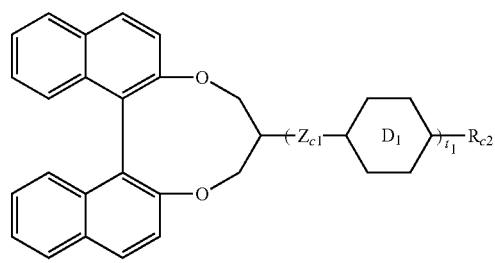
(Ch-5) (Ch-6)

(In the formulae, $R_{c1}$, $R_{c2}$, and R* each independently represent an alkyl group having 1 to 15 carbon atoms, one or more —$CH_2$— in the alkyl group may each be substituted with —O—, —CH=CH—, —CO—, —OCO—, —COO—, —C≡C—, —$CF_2$O—, or —O$CF_2$— so long as oxygen atoms are not directly adjacent to each other, one or more hydrogen atoms in the alkyl group may each be substituted with a halogen, R* has at least one optically active branched chain group or a halogen substituent, $Z_{c1}$ and $Z_{c2}$ each independently represent a single bond, —CH=CH—, —C≡C—, —$CH_2CH_2$—, —$(CH_2)_4$—, —COO—, —OCO—, —$OCH_2$—, —$CH_2O$—, —$OCF_2$—, or —$CF_2O$—, $D_1$ and $D_2$ each represent a cyclohexane ring or a benzene ring, one or more —$CH_2$— in the cyclohexane ring may each be substituted with —O— so long as oxygen atoms are not directly adjacent to each other, one or more —$CH_2CH_2$— in the ring may each be substituted with —CH=CH—, —$CF_2O$—, or —$OCF_2$—, one or more —CH= in the benzene ring may each be substituted with —N= so long as nitrogen atoms are not directly adjacent to each other, one or more hydrogen atoms in the ring may each be substituted with F, Cl, or $CH_3$, $t_1$ and $t_2$ each represent 0, 1, 2, or 3, and MG*, $Q_{c1}$, and $Q_{c2}$ respectively represent the following structures:

[Chem. 54]

MG*

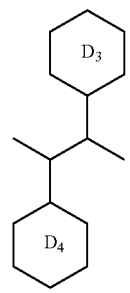

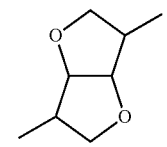

$Q_{c1}$: single bond  —O—  —COO—  —OCO—

$Q_{c2}$:

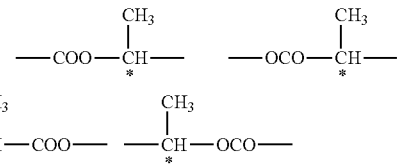

(In the formula, $D_3$ and $D_4$ each represent a cyclohexane ring or a benzene ring, one or more —$CH_2$— in the cyclohexane ring may each be substituted with —O— so long as oxygen atoms are not directly adjacent to each other, one or more —$CH_2CH_2$— in the ring may each be substituted with —CH=CH—, —$CF_2O$—, or —$OCF_2$—, one or more —CH= in the benzene ring may each be substituted with —N═ so long as nitrogen atoms are not directly adjacent to each other, and one or more hydrogen atoms in the ring may each be substituted with F, Cl, or $CH_3$.).

The liquid crystal composition according to the present invention may contain at least one polymerizable compound. The polymerizable compound is preferably a discotic liquid crystal compound having a structure in which linear alkyl groups, linear alkoxy groups, or substituted-benzoyloxy groups constitute side chains radially arranged around a core, which is a benzene derivative, a triphenylene derivative, a truxene derivative, a phthalocyanine derivative, or a cyclohexane derivative, at the molecular center.

Specifically, the polymerizable compound is preferably represented by general formula (PC):

[Chem. 55]

$(P_1-Sp_1-Q_{p1})_{p1}MG_p(-R_{p1})_{p2}$     (PC)

(In the formula, $P_1$ represents a polymerizable functional group, $Sp_1$ represents a spacer group having 0 to 20 carbon atoms, $Q_{p1}$ represents a single bond, —O—, —NH—, —NHCOO—, —OCONH—, —CH═CH—, —CO—, —COO—, —OCO—, —OCOO—, —OOCO—, —CH═CH—, —CH═CH—COO—, —OCO—CH═CH—, or —C≡C—, $p_1$ and $p_2$ each independently represent 1, 2, or 3, $MG_p$ represents a mesogen group or a mesogenic support group, $R_{p1}$ represents a halogen atom, a cyano group, or an alkyl group having 1 to 25 carbon atoms, and one or more $CH_2$ groups in the alkyl group may each be substituted with —O—, —S—, —NH—, —N($CH_3$)—, —CO—, —COO—, —OCO—, —OCOO—, —SCO—, —COS—, or —C≡C— so long as oxygen atoms are not directly adjacent to each other. Alternatively, $R_{p1}$ may represent $P_2-Sp_2-Q_{p2}$- where $P_2$, $Sp_2$, and $Q_{p2}$ are respectively the same as $P_1$, $Sp_1$, and $Q_{p1}$.)

More preferably, the polymerizable compound is one represented by general formula (PC) with $MG_p$ representing the following structure:

  [Chem. 56]

(In the formula, $C_{01}$ to $C_{03}$ each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, or a fluorenone 2,7-diyl group, the 1,4-phenylene group, the 1,2,3,4-tetrahydronaphthalene-2,6-diyl group, the 2,6-naphthylene group, the phenanthrene-2,7-diyl group, the 9,10-dihydrophenanthrene-2,7-diyl group, the 1,2,3,4,4a,9,10a-octahydrophenanthrene-2,7-diyl group, and the fluorenone-2,7-diyl group may each have, as a substituent, at least one F, Cl, $CF_3$, $OCF_3$, cyano group, alkyl group having 1 to 8 carbon atoms, alkoxy group, alkanoyl group, alkanoyloxy group, alkenyl group having 2 to 8 carbon atoms, alkenyloxy group, or alkenoyloxy group, $Z_{p1}$ and $Z_{p2}$ each independently represent —COO—, —OCO—, —$CH_2CH_2$—, —$OCH_2$—, —$CH_2O$—, —CH═CH—, —C≡C—, —CH═CHCOO—, —OCOCH═CH—, —$CH_2CH_2COO$—, —$CH_2CH_2OCO$—, —$COOCH_2CH_2$—, —$OCOCH_2CH_2$—, —CONH—, —NHCO—, or a single bond, and $p_3$ represents 0, 1, or 2.)

Here, when $Sp_1$ and $Sp_2$ each independently represent an alkylene group, that alkylene group may be substituted with one or more halogen atoms or CN and one or more $CH_2$ groups in this group may each be substituted with —O—, —S—, —NH—, —N($CH_3$)—, —CO—, —COO—, —OCO—, —OCOO—, —SCO—, —COS—, or —C≡C— so long as oxygen atoms are not directly adjacent to each other. $P_1$ and $P_2$ are each preferably one of the structures represented by the following general formulae:

[Chem. 57]

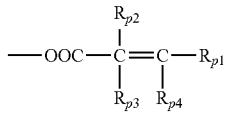     (PC0-a)

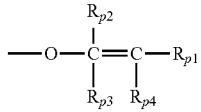     (PC0-b)

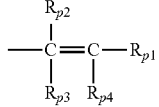     (PC0-c)

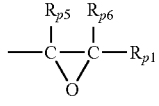     (PC0-d)

(In the formulae, $R_{p2}$ to $R_{p6}$ each independently represent a hydrogen atom, a halogen atom, or an alkyl group having 1 to 5 carbon atoms.)

Specifically, the polymerizable compound represented by general formula (PC) is preferably selected from polymerizable compounds represented by general formula (PC0-1) to general formula (PC0-6):

[Chem. 58]

$(P_1-Sp_1-Q_{p1})_{p1}MG_p(-Q_{p2}-Sp_2-P_2)_{p4}$     (PC0-1)

$(P_1-Q_{p1})_{p1}MG_p(-Q_{p2}-P_2)_{p4}$     (PC0-2)

$P_1-Sp_1-Q_{p1}-MG_p-Q_{p2}-Sp_2-P_2$     (PC0-3)

$P_1-Q_{p1}-MG_p-Q_{p2}-P_2$     (PC0-4)

$P_1-Sp_1-Q_{p1}-MG_p-R_{p1}$     (PC0-5)

$P_1-Q_{p1}-MG_p-R_{p1}$     (PC0-6)

(In the formulae, $p_4$ each independently represent 1, 2, or 3.) More specifically, polymerizable compounds represented by general formula (PC1-1) to general formula (PC1-9) are preferable.

[Chem. 59]

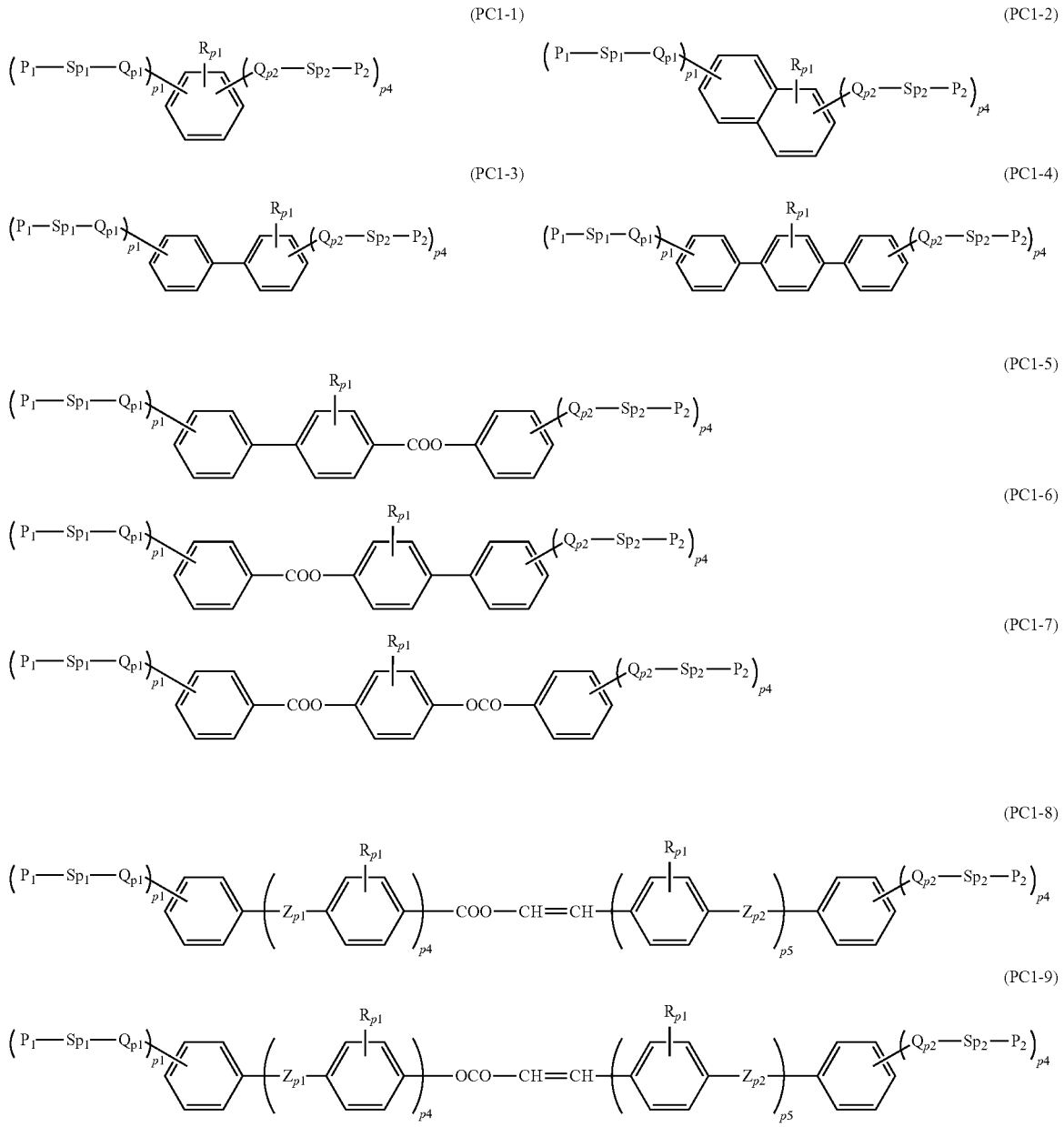

(In the formulae, $p_5$ represents 0, 1, 2, 3, or 4.) In particular, $Sp_1$, $Sp_2$, $Q_{p1}$, and $Q_{p2}$ preferably each represent a single bond, $P_1$ and $P_2$ are preferably each represented by formula (PC0-a) and more preferably each represent an acryloyloxy group or a methacryloyloxy group, $p_1+p_4$ is preferably 2, 3, or 4, and Q preferably represents H, F, $CF_3$, $OCF_3$, $CH_3$, or $OCH_3$. More preferable are compounds represented by general formula (PC1-2), general formula (PC1-3), general formula (PC1-4), and general formula (PC1-8).

Also preferable are discotic liquid crystal compounds represented by general formula (PC) with $MG_p$ being represented by general formula (PC1)-9:

[Chem. 60]

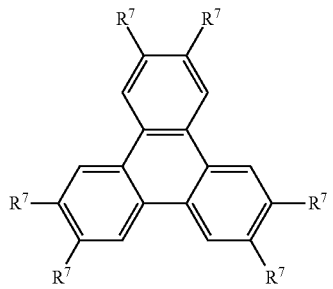

(PC1)-9

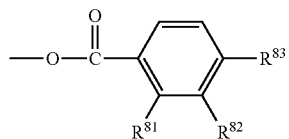
(PC1-e)

(In the formula, $R_7$ each independently represent $P_1$-$Sp_1$-$Q_{p1}$ or a substituent represented by general formula (PC1-e), $R_{81}$ and $R_{82}$ each independently represent a hydrogen atom, a halogen atom, or a methyl group, $R_{83}$ represents an alkoxy group having 1 to 20 carbon atoms, and at least one hydrogen atom in the alkoxy group is substituted with a substituent represented by any one of general formula (PC0-a) to (PC0-d) described above.)

The amount of the polymerizable compound used is preferably 0.05% to 2.0% by mass.

The liquid crystal composition containing a polymerizable compound according to the present invention is used to prepare a liquid crystal display device by polymerizing the polymerizable compound. During this process, the amount of the unpolymerized components must be decreased to a desired level or lower and thus the compound represented by general formula (LC0) in the liquid crystal composition preferably includes a biphenyl group or a terphenyl group as a partial structure. Specifically, compounds represented by general formula (LC0-10) to general formula (LC0-27), general formula (LC0-48) to general formula (LC0-53), and general formula (LC0-60) to general formula (LC0-68) are preferable and preferably at least one compound is selected from these compounds and contained in an amount of 0.1% to 40% by mass. It is preferable to use a combination of polymerizable compounds selected from those represented by general formula (PC1-1) to general formula (PC1-3), general formula (PC1-8), or general formula (PC1-9).

The liquid crystal composition may further contain one or more antioxidants and one or more UV absorbers. The antioxidants are preferably selected from those represented by general formula (E-1) and/or general formula (E-2) below.

[Chem. 61]

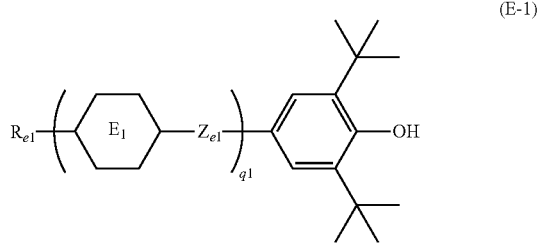
(E-1)

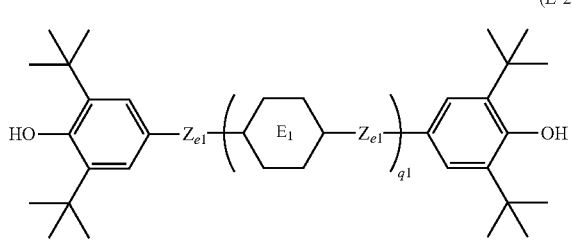
(E-2)

(In the formula, $R_{e1}$ represents an alkyl group having 1 to 15 carbon atoms, one or more —$CH_2$— in the alkyl group may each be substituted with —O—, —CH=CH—, —CO—, —OCO—, —COO—, —C≡C—, —$CF_2$O—, or —$OCF_2$— so long as oxygen atoms are not directly adjacent to each other, one or more hydrogen atoms in the alkyl group may each be substituted with a halogen, $Z_{e1}$ and $Z_{e2}$ each independently represent a single bond, —CH=CH—, —C≡C—, —$CH_2CH_2$—, —$(CH_2)_4$—, —COO—, —OCO—, —$OCH_2$—, —$CH_2O$—, —$OCF_2$—, or —$CF_2O$—, $E_1$ represents a cyclohexane ring or a benzene ring, one or more —$CH_2$— in the cyclohexane ring may each be substituted with —O— so long as oxygen atoms are not directly adjacent to each other, one or more —$CH_2CH_2$— in the ring may each be substituted with —CH=CH—, —$CF_2O$—, or —$OCF_2$—, one or more —CH= in the benzene ring may each be substituted with —N= so long as nitrogen atoms are not directly adjacent to each other, at least one hydrogen atom in the ring may be substituted with F, Cl, or $CH_3$, and $q_1$ represents 0, 1, 2, or 3.)

The liquid crystal composition of the present invention can be used in liquid crystal display devices, in particular, active matrix drive liquid crystal display devices of, for example, TN mode, OCB mode, ECB mode, IPS (including FFS electrodes) mode, or VA-IPS mode (including FFS electrodes). Here, the VA-IPS mode refers to a driving mode with which a liquid crystal material having positive dielectric anisotropy (Δε>0) is aligned perpendicular to the substrate surface in the absence of applied voltage and liquid crystal molecules are driven by using pixel electrodes and a common electrode disposed on the same substrate surface. Since liquid crystal molecules align in the direction of the bend electric field generated between the pixel electrodes and the common electrode, divided pixels and multi-domains can be easily formed and the response is excellent, which is an advantage. According to Non-Patent Literatures, Proc. 13th IDW, 97 (1997), Proc. 13th IDW, 175 (1997), SID Sym. Digest, 319 (1998), SID Sym. Digest, 838 (1998), SID Sym. Digest, 1085 (1998), SID Sym. Digest, 334 (2000), and Eurodisplay Proc., 142 (2009), various names are used such as EOC and VA-IPS. In the present invention, this mode is simply referred to as "VA-IPS".

In general, the threshold voltage (Vc) for Fréedericksz transition in TN and ECB mode is given by the following formula:

$$Vc = \frac{\Pi d_{cell}}{d_{cell} + \langle r1 \rangle} \sqrt{\frac{K11}{\Delta\varepsilon}} \qquad [\text{Math. 1}]$$

In IPS mode, it is given by the following formula:

$$Vc = \frac{\Pi d_{gap}}{d_{cell} + \langle r2 \rangle} \sqrt{\frac{K22}{\Delta\varepsilon}} \qquad [\text{Math. 2}]$$

In VA mode, it is given by the following formula:

$$Vc = \frac{\Pi d_{cell}}{d_{cell} - \langle r3 \rangle} \sqrt{\frac{K33}{|\Delta\varepsilon|}} \qquad [\text{Math. 3}]$$

(In the formula, Vc represents Fréedericksz transition (V), Π represents the circular constant, $d_{cell}$ represents a distance (μm) between a first substrate and a second substrate, $d_{gap}$ represents a distance (μm) between pixel electrodes and a common electrode, $d_{ITO}$ represents a width (μm) of the pixel electrodes and/or the common electrode, <r1>, <r2>, and <r3> each represent the extrapolation length (μm), K11 represents the splay elastic constant (N), K22 represents the twist elastic constant (N), K33 represents the bend elastic constant (N), and Δ∈ represents anisotropy of dielectric constant.)

In VA-IPS mode, Mathematical formula 4 below is applied to the present invention and the like.

$$Vc \propto \frac{d_{gap} - \langle r' \rangle \Pi d_{cell}}{d_{ITO} + \langle r \rangle d_{cell} - \langle r3 \rangle} \sqrt{\frac{K33}{|\Delta \varepsilon|}} \quad [\text{Math. 4}]$$

(In the formula, Vc represents the Fréedericksz transition (V), Π represents the circular constant, $d_{cell}$ represents a distance (μm) between a first substrate and a second substrate, $d_{gap}$ represents a distance (μm) between the pixel electrodes and the common electrode, $d_{ITO}$ represents a width (μm) of the pixel electrodes and/or the common electrode, <r>, <r'>, and <r3> each represent an extrapolation length (μm), K33 represents the bend elastic constant (N), and Δ∈ represents anisotropy of dielectric constant.) From Mathematical formula 4, a cell structure can be derived in which low drive voltage can be achieved by decreasing $d_{gap}$ as much as possible and increasing $d_{ITO}$ as much as possible and in which low drive voltage can be achieved by choosing and using a liquid crystal composition that has a large absolute value of Δ∈ and a small K33.

A liquid crystal display device prepared by using the liquid crystal composition according to the present invention can be prepared by employing, as a method for aligning the liquid crystal molecules on the substrate surface, a rubbing treatment that uses a polyimide or polyamide compound or the like. It can also be prepared by an optical alignment technique by using a chalcone, cinnamate, or cinnamoyl compound or the like. A new alignment method of incorporating a polymerizable liquid crystal compound into an alignment layer and polymerizing the polymerizable liquid crystal compound can also be applied.

According to the liquid crystal composition of the present invention, Δ∈, K11, K33, etc., can be adjusted to desired values.

The product (Δn·d) of the refractive index anisotropy (Δn) of the liquid crystal composition and the distance (d) between the first substrate and the second substrate of the display device has a strong correlation with the viewing angle properties and response speed. In this respect, the distance (d) tends to be as small as 3 to 4 μm. The product (Δn·d) is particularly preferably 0.31 to 0.33 for the TN, ECB, and IPS (liquid crystal alignment in the absence of voltage application is substantially horizontal to the substrate surface) modes. In the VA-IPS mode, the product is preferably 0.20 to 0.59 and particularly preferably 0.30 to 0.40 when the alignment is vertical to the two substrates. Since the optimum value of the product (Δn·d) differs depending on the mode of the display device, the refractive index anisotropy (Δn) of the liquid crystal composition suitable for various modes is in the range of 0.070 to 0.110, 0.100 to 0.140, or 0.130 to 0.180. A liquid crystal composition having a refractive index anisotropy (Δn) in any of various different ranges can be prepared.

The liquid crystal composition according to the present invention, which contains a compound represented by general formula (PC) as a polymerizable compound, can offer a polymer-stabilized TN-mode, OCB-mode, ECB-mode, IPS-mode or VA-IPS mode liquid crystal display device prepared by polymerizing the polymerizable compound contained in the liquid crystal composition in the presence or absence of the applied voltage. Specifically, the liquid crystal composition containing a polymerizable compound is interposed between the two substrates and the polymerizable compound in the liquid crystal composition is polymerized through energy such as UV light in the presence or absence of the applied voltage. With this liquid crystal display device, the alignment state of the liquid crystal molecules can be memorized by polymerizing the polymerizable compound and thus the stability of the alignment state can be improved. The response speed can also be expected to improve.

EXAMPLES

The present invention will now be described in further detail through examples below which do not limit the scope of the present invention. In Examples and Comparative Examples below, "%" associated with the compositions means % by mass.

The physical properties of the liquid crystal composition are denoted as follows.

$T_{N-I}$: nematic phase-isotropic liquid phase transition temperature (° C.)
T-n: nematic phase lower limit temperature (° C.)
∈⊥: dielectric constant in a direction perpendicular to a molecular long axis at 25° C.
Δ∈: dielectric anisotropy at 25° C.
no: refractive index for ordinary light at 25° C.
Δn: refractive index anisotropy at 25° C.
Vth: applied voltage (V) of a 6 μm-thick cell whose transmittance changed by 10% when square waves at a frequency of 1 KHz were applied at 25° C.
η: bulk viscosity at 20° C. (mPa·s)
$γ_1$: rotational viscosity (mPa·s)
K11/pN: splay elastic constant (N)
K22/pN: twist elastic constant (N)
K33/pN: bend elastic constant (N)

The following abbreviations are used to describe compounds.

TABLE 1

| n | $C_nH_{2n+1}$— | -2- | —$CH_2CH_2$— | —F | —F |
|---|---|---|---|---|---|
| m | —$C_mH_{2m+1}$ | -d- | —CH=CH— | —Cl | —Cl |
| nO | $C_nH_{2n+1}$O— | -T- | —C≡C— | —CN | —C≡N |
| Om | —O$C_mH_{2m+1}$ | —1O— | —$CH_2$O— | —CFFF | —$CF_3$ |
| ndm- | $C_nH_{2n+1}$—CH=CH—$(CH_2)_{m-1}$— | —O1— | —$OCH_2$— | —CFF | —$CHF_2$ |
| -ndm | —$(CH_2)_{n-1}$—CH=CH—$C_mH_{2m+1}$ | —CFFO— | —$CF_2$O— | —OCFFF | —$OCF_3$ |
| ndmO— | $C_nH_{2n+1}$—CH=CH—$(CH_2)_{m-1}$—O— | —OCFF— | —$OCF_2$— | —OCFF | —$OCHF_2$ |

TABLE 1-continued

| —Ondm | —O—(CH$_2$)$_{n-1}$—CH=CH—C$_m$H$_{2m+1}$ | —V— | —CO— | —OCFFCFFF | —OCF2CF$_3$ |
|---|---|---|---|---|---|
| | | —VO— | —COO— | —CFFCFFF | —CF2CF$_3$ |
| | | —OV— | —OCO— | —OCF=CFF | —OCF=CF$_2$ |
| | | | | —OCH=CFF | —OCH=CF$_2$ |

[Chem. 62]

 Cy

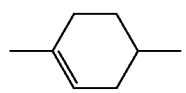 Cy1

 Cy2

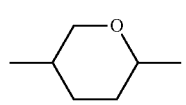 Prn

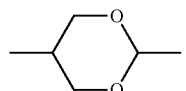 Oc

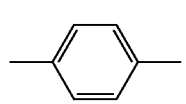 Ph

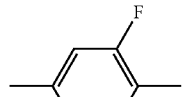 Ph1

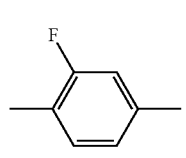 Ph2

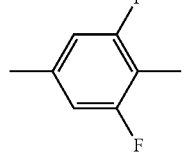 Ph3

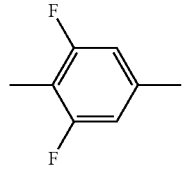 Ph4

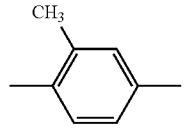 Ph5

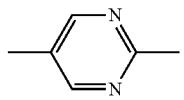 Ma

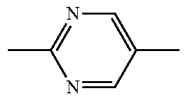 Mb

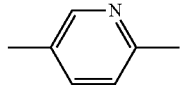 Mc

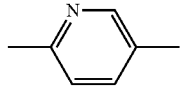 Md

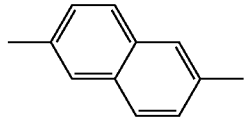 Np

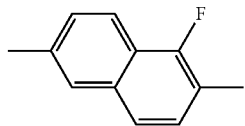 Np1

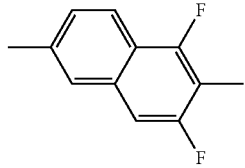 Np3

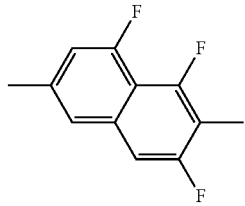 Np4

The measured properties of the liquid crystal compositions stored at −20° C., −25° C., −30° C., and −40° C. are indicated in the table. In the table, numerals indicate the storage time, A indicates that the sample after the storage time maintained a liquid crystal state similar to one before storage, and F indicates that precipitation occurred during the storage time.

Examples 1 to 6

The liquid crystal compositions prepared and their physical properties are shown below.

TABLE 2

|  | Example 1 | Example 2 | Example 3 | Example 4 | Example 5 | Example 6 |
|---|---|---|---|---|---|---|
| 3-Cy-Cy-1d0 | 40 | 43 | 42 | 40.5 | 41.5 | 39 |
| 0d1-Cy-Cy-Ph-1 | 14 | 15 | 11 | 14 | 15 | 15 |
| 0d3-Cy-Cy-Ph-1 |  | 4.5 | 5 |  | 2 |  |
| 0d1-Cy-Ph-Ph-3 |  | 2 |  |  |  |  |
| 3-Cy-Cy-VO-Ph-Cy-3 | 4 | 3 | 4 | 4 | 4 | 5 |
| 3-Cy-Cy-VO-Ph-Cy-4 | 3 | 2 | 2 | 3 | 3 | 4 |
| 3-Ph-Ph1-Ph3-O2d0 | 6 | 4 | 5.5 | 7 | 5 | 4 |
| 3-Cy-Cy-Ph1-F |  |  | 4 |  |  |  |
| 3-Cy-Cy-Ph3-F | 10 |  |  | 10 |  |  |
| 3-Cy-Ph-Ph3-F |  |  |  |  | 8 | 15 |
| 2-Cy-Ph-Ph3-O1-Ph3-F |  | 3 | 3 |  |  |  |
| 3-Cy-Ph-Ph3-O1-Ph3-F | 5 | 5 | 5 | 5 | 5 |  |
| 3-Ph3-O1-Oc-Ph-Ph3-F | 4 | 4 | 4 | 4 | 4 | 4 |
| 4-Ph3-O1-Oc-Ph-Ph3-F | 4.5 | 4.5 | 4.5 | 4 | 4 | 4 |
| 3-Ph3-O1-Oc-Ph1-Ph3-F | 6 | 6 | 6 | 5 | 5 | 6 |
| 5-Ph3-O1-Oc-Ph1-Ph3-F | 3.5 | 4 | 4 | 3.5 | 3.5 | 4 |
| Tni (° C.) | 100.2 | 99.9 | 101.1 | 100.5 | 99.2 | 100.3 |
| T→N (° C.) | −38 | −35 | −37 | −42 | −38 | −43 |
| Δn | 0.096 | 0.098 | 0.099 | 0.098 | 0.099 | 0.100 |
| no | 1.484 | 1.485 | 1.484 | 1.483 | 1.485 | 1.485 |
| Δε | 8.0 | 7.3 | 8.0 | 7.3 | 7.1 | 7.8 |
| ε⊥ | 3.5 | 3.4 | 3.5 | 3.4 | 3.4 | 3.4 |
| γ1/mPa·s | 75 | 72 | 79 | 74 | 68 | 77 |
| η/mPa·s | 14.7 | 14.0 | 14.2 | 13.7 | 14.7 | 14.4 |
| Vth/Vrms | 1.666 | 1.790 | 1.731 | 1.762 | 1.783 | 1.721 |
| K11/pN | 12.2 |  | 12.5 |  | 12.0 | 11.9 |
| K22/pN | 6.6 |  | 7.1 |  | 7.0 | 6.7 |
| K33/pN | 16.1 |  | 17.0 |  | 16.0 | 15.9 |
| Low-temperature storage property (−30° C.) (hr/A or F.) |  |  |  | 168 hr/A | 168 hr/A |  |

Comparative Examples 1 and 2

The liquid crystal compositions prepared and their physical properties are shown below.

TABLE 3

|  | Comparative Example 1 | Comparative Example 2 |
|---|---|---|
| 3-Cy-Cy-1d0 | 31 | 31 |
| 3-Cy-Cy-Ph-1 | 8 |  |
| 3-Cy-Cy-Ph-3 | 5 |  |
| 0d1-Cy-Cy-Ph-1 |  | 13 |
| 2-Cy-Cy-Ph1—F | 10 | 10 |
| 3-Cy-Cy-Ph1—F | 14 | 14 |
| 2-Cy-Cy-Ph—Ph1—F | 2 | 2 |
| 3-Cy-Cy-Ph—Ph1—F | 4 | 4 |
| 3-Cy-Ph1—Np3—F | 7 | 7 |
| 3-Ph3—O1—Ph—Np3—F | 8 | 8 |
| 2-Ph3—O1-Cy-Ph3—Ph3—F | 6 | 6 |
| 3-Ph3—O1-Cy-Ph3—Ph3—F | 5 | 5 |
| Tni (° C.) | 99.5 | 97.7 |
| T→N (° C.) | −54 | −56 |
| Δn | 0.099 | 0.101 |
| no | 1.487 | 1.488 |
| Δε | 8.0 | 7.9 |
| ε⊥ | 3.4 | 3.4 |
| γ1/mPa·s | 94 | 87 |
| η/mPa·s | 18.4 | 18.5 |
| Vth/Vrms | 1.710 | 1.706 |
| Low-temperature storage property (−30° C.) (hr/A or F) | 72 hr/F | 72 hr/F |

Comparative Examples were prepared so that the nematic phase-isotropic liquid phase transition temperature ($T_{N-I}$) and the value of the dielectric anisotropy (Δε) at 25° C. were about the same level as those of Examples. Whereas η in Examples 1 to 6 was in the range of 13.7 mPa·s to 14.7 mPa·s, η in Comparative Examples 1 and 2 was 18.4 mPa·s and 18.5 mPa·s, respectively. Whereas $\gamma_1$ in Examples 1 to 6 was in the range of 68 mPa·s to 79 mPa·s, $\gamma_1$ in Comparative Examples 1 and 2 was 94 Pa·s and 87 Pa·s, respectively. In the liquid crystal compositions of Examples 4 and 5, precipitation was not observed after 168 hours of storage at −30° C. and excellent low-temperature phase stability was confirmed. However, in the liquid crystal compositions of Comparative Examples 1 and 2, precipitation was observed after 72 hours at −30° C.

The results show that the liquid crystal compositions of Examples 1 to 6 in which a compound represented by general formula (LC0) was used according to the subject application exhibited significantly lower γ1 and excellent low-temperature storage property compared to the liquid crystal compositions of Comparative Examples 1 and 2 in which no compound represented by general formula (LC0) was used.

Examples 7 to 10

The liquid crystal compositions prepared and their physical properties are shown below.

TABLE 4

|  | Example 7 | Example 8 | Example 9 | Example 10 |
|---|---|---|---|---|
| 3-Cy-Cy-1d0 | 29 | 29 | 14 | 14 |
| 3-Cy-Cy-1d1 | 9 | 9 | 9 | 9 |
| 3-Cy-Cy-3d0 | 7 | 7 | 7 | 7 |
| 2-Cy-Cy-1d1 |  |  | 15 | 15 |
| 0d1-Cy-Cy-Ph-1 | 7 | 7 | 7 | 7 |
| 0d3-Cy-Cy-Ph-1 | 8 | 8 | 8 | 8 |
| 5-Ph—Ph-1 |  |  |  |  |
| 1d3-Ph—Ph-1 | 3 | 3 | 3 | 3 |
| 1-Ph—Ph1—Ph-3d0 | 4 | 4 | 4 |  |
| 2-Ph—Ph1—Ph-3d0 | 6 | 6 | 6 | 6 |
| 3-Ph—Ph1—Ph-3d0 | 4 | 4 | 4 | 2 |
| 2Ph—Ph1—Np-3d0 |  |  |  | 6 |
| 3-Ph—Ph1—Ph3—CFFO—Np3—F | 3 | 3 | 3 | 3 |
| 2-Cy-Ph—Ph3—O1—Ph3—F | 3 | 3 | 3 | 3 |
| 3-Cy-Ph—Ph3—O1—Ph3—F | 5 | 5 | 5 | 5 |
| 4-Cy-Ph1—Ph3—O1—Ph3—F |  | 4 | 4 | 4 |
| 3-Ph3—O1-Oc-Ph—Ph3—F | 4 |  |  |  |
| 4-Ph3—O1-Oc-Ph—Ph3—F | 5 | 5 | 5 | 5 |
| 5-Ph3—O1-Oc-Ph—Ph3—F | 3 | 3 | 3 | 3 |
| Tni (° C.) | 96.6 | 96.2 | 96.2 | 99.9 |
| T→N (° C.) | −22 | −22 | −22 | −20 |
| Δn | 0.120 | 0.121 | 0.122 | 0.124 |
| no | 1.492 | 1.491 | 1.491 | 1.493 |
| Δ∈ | 5.5 | 5.0 | 4.9 | 5.0 |
| ∈⊥ | 3.1 | 3.0 | 3.1 | 3.0 |
| γ1/mPa · s | 66 | 64 | 66 | 74 |
| η/mPa · s | 13.2 | 12.4 | 13.7 | 14.3 |
| Vth/Vrms | 2.341 | 2.433 | 2.451 | 2.483 |

Examples 11 to 17

The liquid crystal compositions prepared and their physical properties are shown below.

TABLE 5

|  | Example 11 | Example 12 | Example 13 | Example 14 | Example 15 | Example 16 | Example 17 |
|---|---|---|---|---|---|---|---|
| 3-Cy-Cy-1d0 | 29 | 29 | 29 | 29 | 29 | 29.5 | 29.5 |
| 3-Cy-Cy-1d1 | 9 | 9 | 9 | 9 | 9 | 9 | 9 |
| 3-Cy-Cy-3d0 | 5 | 7 | 5 | 5 | 4 | 5 | 5 |
| 0d1-Cy-Cy-Ph-1 | 8 | 8.5 | 8 | 10 | 12 | 10.5 | 8 |
| 0d3-Cy-Cy-Ph-1 | 10 | 10 | 11 | 10 | 12 | 10 | 10 |
| 0d1-Cy-Ph-Ph-3 | 4 | 2 | 6 | 6 |  | 6 | 4 |
| 1-Ph-Ph1-Ph-3d0 | 4 | 4 | 4 | 4 | 6 | 4 | 4 |
| 2-Ph-Ph1-Ph-3d0 | 6 | 6 | 6 | 7 | 8 | 7 | 6.5 |
| 3-Ph-Ph1-Ph-3d0 | 4 | 4 | 4 | 4 | 4 | 4 | 4 |
| 3-Ph-Ph1-Ph3-CFFO-Np3-F |  | 3 |  |  |  |  |  |
| 2-Cy-Ph-Ph3-O1-Ph3-F | 4 | 3 |  |  |  |  | 4 |
| 3-Cy-Ph-Ph3-O1-Ph3-F | 5 | 4.5 |  |  |  |  | 5 |
| 3-Ph3-O1-Oc-Ph-Ph3-F | 4 | 3 | 4 | 3 | 3 | 4 | 4 |
| 4-Ph3-O1-Oc-Ph-Ph3-F | 5 | 5 | 5 | 4 | 4 | 5 | 5 |
| 5-Ph3-O1-Oc-Ph-Ph3-F | 3 | 2 | 3 | 3 | 3 |  | 2 |
| 3-Ph3-O1-Oc-Ph1-Ph3-F |  |  | 6 | 6 | 6 | 6 |  |
| Tni (° C.) | 102.3 | 102.2 | 101.0 | 101.1 | 102.4 | 100.8 | 101.7 |
| T→N (° C.) | −29 | −28 | −29 | −30 | −32 | −30 | −29 |
| Δn | 0.119 | 0.118 | 0.117 | 0.118 | 0.119 | 0.117 | 0.119 |
| no | 1.492 | 1.492 | 1.492 | 1.493 | 1.493 | 1.493 | 1.492 |
| Δε | 4.8 | 4.7 | 5.5 | 4.8 | 4.8 | 4.5 | 4.4 |
| ε⊥ | 3.0 | 3.0 | 3.1 | 3.0 | 3.0 | 3.0 | 3.0 |
| γ1/mPa · s | 64 | 64 | 66 | 64 | 65 | 61 | 62 |
| η/mPa · s | 14.8 | 13.4 | 14.4 | 14.2 | 14.3 | 13.7 | 13.7 |
| Vth/Vrms | 2.483 | 2.503 | 2.338 | 2.469 | 2.485 | 2.524 | 2.576 |
| K11/pN |  |  |  |  |  | 14.5 | 14.6 |
| K22/pN |  |  |  |  |  | 7.8 | 8.4 |
| K33/pN |  |  |  |  |  | 17.4 | 17.8 |
| Low-temperature storage property (−20° C.) (hr/A or F.) | 168 hr/A | 672 hr/A |  |  |  | 336 hr/A | 336 hr/A |

Examples 18 to 22

The liquid crystal compositions prepared and their physical properties are shown below.

TABLE 6

|  | Example 18 | Example 19 | Example 20 | Example 21 | Example 22 |
|---|---|---|---|---|---|
| 3-Cy-Cy-1d0 | 42 | 38 | 43 | 39 | 34 |
| 3-Cy-Ph—O1 |  |  |  | 4 | 4 |
| 0d1-Cy-Cy-Ph-1 | 12 | 14 | 11 | 12 | 15 |
| 0d3-Cy-Cy-Ph-1 | 10 | 12 | 8 | 8 | 12 |
| 5-Ph—Ph-1 |  |  | 1 |  |  |
| 0d1-Cy-Ph—Ph-3 |  |  | 2 | 2 |  |
| 1d1-Cy-Ph—Ph-3 |  |  |  |  |  |
| 3-Cy-Ph—Ph-2 |  |  | 2 | 2 |  |
| 1-Ph—Ph1—Ph-3d0 | 4 | 4 | 3 | 3 | 4 |
| 2-Ph—Ph1—Ph-3d0 | 8 | 6 | 7 | 7 | 6 |
| 3-Ph—Ph1—Ph-3d0 | 9 | 8 | 8 | 8 | 6 |
| 2-Cy-Ph—Ph3—O1—Ph3—F |  |  |  |  | 2 |
| 3-Cy-Ph—Ph3—O1—Ph3—F | 4 | 5 | 4 | 4 | 4 |
| 3-Ph3—O1-Oc-Ph—Ph3—F | 3 | 3 | 3 | 3 | 3 |
| 4-Ph3—O1-Oc-Ph—Ph3—F | 3 | 3 | 3 | 3 | 3 |
| 3-Ph3—O1-Oc-Ph1—Ph3—F |  | 4 | 5 | 5 | 4 |
| 5-Ph3—O1-Oc-Ph1—Ph3—F | 5 | 3 |  |  | 3 |
| Tni (° C.) | 98.1 | 102.1 | 94.8 | 95.2 | 100.5 |
| T→N (° C.) | −28 | −36 | −30 | −28 | −47 |
| Δn | 0.122 | 0.121 | 0.119 | 0.120 | 0.120 |
| no | 1.494 | 1.494 | 1.494 | 1.495 | 1.494 |
| Δ∈ | 3.9 | 4.8 | 3.9 | 3.9 | 5.0 |
| ∈⊥ | 3.0 | 3.1 | 3.0 | 3.0 | 3.1 |
| γ1/mPa · s | 55 | 63 | 52 | 53 | 68 |
| η/mPa · s | 12.3 | 13.4 | 12.4 | 12.8 | 13.8 |
| Vth/Vrms | 2.644 | 2.454 | 2.610 | 2.570 | 2.350 |
| K11/pN |  |  | 13.7 |  | 14.4 |
| K22/pN |  |  | 8.3 |  | 9.6 |
| K33/pN |  |  | 17.2 |  | 17.3 |
| Low-temperature storage property (−20° C.) (hr/A or F) |  | 168 hr/A | 168 hr/A | 504 hr/A | 504 hr/A |

Examples 23 to 27

The liquid crystal compositions prepared and their physical properties are shown below.

TABLE 7

|  | Example 23 | Example 24 | Example 25 | Example 26 | Example 27 |
|---|---|---|---|---|---|
| 3-Cy-Cy-1d0 | 42 | 43.5 | 44 | 43 | 44 |
| 0d1-Cy-Cy-Ph-1 | 10 | 12 | 14 | 13 | 13.5 |
| 0d3-Cy-Cy-Ph-1 | 7 | 9 | 10 | 9 | 9 |
| 5-Ph—Ph-1 |  |  |  |  | 4 |
| 1-Ph—Ph1—Ph-3d0 | 4 | 4 | 4 | 4 |  |
| 2-Ph—Ph1—Ph-3d0 | 6 | 6 | 8 | 8 | 5 |
| 3-Ph—Ph1—Ph-3d0 | 4 | 3 |  | 3 |  |
| 3-Cy-Cy-VO—Ph-Cy-3 | 3 | 4 | 4 | 4 | 4 |
| 2-Ph—Ph1—Np-3 |  |  |  |  | 4.5 |
| 3-Cy-Cy-Ph1—F | 5 |  |  |  |  |
| 2-Cy-Ph—Ph3—O1—Ph3—F | 3 |  |  |  |  |
| 3-Cy-Ph—Ph3—O1—Ph3—F | 5 |  |  |  |  |
| 3-Ph3—O1-Oc-Ph—Ph3—F | 4 | 4 | 3 | 3 | 3 |
| 4-Ph3—O1-Oc-Ph—Ph3—F | 4 |  |  |  |  |
| 3-Ph3—O1-Oc-Ph1—Ph3—F | 3 | 6 | 6 | 6 | 6 |
| 4-Ph3—O1-Oc-Ph1—Ph3—F |  | 5 | 4 | 4 | 4 |
| 5-Ph3—O1-Oc-Ph1—Ph3—F |  | 3.5 | 3 | 3 | 3 |
| Tni (° C.) | 100.1 | 99.4 | 100.2 | 100.5 | 95.1 |
| T→N (° C.) | −35 | −30 | −37 | −39 | −40 |
| Δn | 0.112 | 0.108 | 0.105 | 0.111 | 0.105 |
| no | 1.491 | 1.490 | 1.490 | 1.491 | 1.491 |
| Δ∈ | 4.8 | 6.0 | 5.0 | 5.1 | 5.0 |
| ∈⊥ | 3.1 | 3.2 | 3.1 | 3.1 | 3.1 |
| γ1/mPa · s | 64 | 68 | 61 | 64 | 62 |
| η/mPa · s | 13.0 | 13.4 | 12.4 | 12.7 | 12.6 |
| Vth/Vrms | 2.343 | 2.076 | 2.187 | 2.267 | 2.234 |

Examples 28 to 31

The liquid crystal compositions prepared and their physical properties are shown below.

TABLE 8

|  | Example 28 | Example 29 | Example 30 | Example 31 |
|---|---|---|---|---|
| 3-Cy-Cy-1d0 | 44 | 43 | 43 | 40 |
| 0d1-Cy-Cy-Ph-1 | 14 | 14 | 13 | 9 |
| 0d3-Cy-Cy-Ph-1 | 9 | 10 | 9.5 | 5 |
| 5-Ph—Ph-1 | 3 | 5 | 4 | 5.5 |
| 0d1-Cy-Ph—Ph-2 |  |  |  | 7 |
| 0d1-Cy-Ph—Ph-3 |  |  |  | 7.5 |
| 3-Cy-Ph—Ph-2 |  |  |  | 6 |
| 3-Cy-Cy-VO—Ph-Cy-3 | 4 | 4 | 4.5 | 4 |
| 2-Ph—Ph1—Np-3 | 5 | 4 | 5 |  |
| 2Ph—Ph1—Np-3d0 | 5 | 4 | 5 |  |
| 3-Ph3—O1-Oc-Ph—Ph3—F | 3 | 3 | 3 | 3 |
| 3-Ph3—O1-Oc-Ph1—Ph3—F | 6 | 6 | 6 | 6 |
| 4-Ph3—O1-Oc-Ph1—Ph3—F | 4 | 4 | 4 | 4 |
| 5-Ph3—O1-Oc-Ph1—Ph3—F | 3 | 3 | 3 | 3 |
| $T_{ni}$ (° C.) | 104.2 | 97.1 | 100.7 | 93.9 |
| T→N (° C.) | −36 | −41 | −36 | −13 |
| $\Delta n$ | 0.113 | 0.106 | 0.110 | 0.106 |
| $n_o$ | 1.492 | 1.492 | 1.492 | 1.493 |
| $\Delta \epsilon$ | 5.1 | 5.0 | 5.1 | 4.9 |
| $\epsilon_\perp$ | 3.1 | 3.0 | 3.1 | 3.0 |
| $\gamma_1$/mPa·s | 73 | 65 | 73 | 59 |
| $\eta$/mPa·s | 14.6 | 12.8 | 13.5 | 12.7 |
| $V_{th}/V_{rms}$ | 2.325 | 2.234 | 2.291 | 2.250 |

Examples 32 to 34

The liquid crystal compositions prepared and their physical properties are shown below.

TABLE 9

|  | Example 32 | Example 33 | Example 34 |
|---|---|---|---|
| 3-Cy-Cy-1d0 | 41.5 | 44 | 44 |
| 2-Cy-Cy-1d1 |  | 6 | 3 |
| 0d1-Cy-Cy-Ph-1 | 8 | 12 | 12 |
| 0d3-Cy-Cy-Ph-1 | 4 | 5 | 5.5 |
| 5-Ph—Ph-1 | 5.5 |  |  |
| 0d1-Cy-Ph—Ph-2 | 6 |  |  |
| 0d1-Cy-Ph—Ph-3 | 6 | 3 | 5 |
| 3-Cy-Ph—Ph-2 | 4 | 3 | 3 |
| 5-Cy-Ph—Ph-2 | 4 |  |  |
| 3-Cy-Cy-VO—Ph-Cy-3 | 4 | 4 | 4.5 |
| 2-Ph—Ph1—Np-3 |  | 5 | 5 |
| 3-Ph—Ph3—CFFO—Np3—F | 4 | 5 | 5 |
| 3-Ph—Ph1—Ph3—CFFO—Np3—F | 5 | 5 | 5 |
| 3-Ph3—O1-Oc-Ph—Ph3—F |  |  |  |
| 3-Ph3—O1-Oc-Ph1—Ph3—F | 4 | 4 | 4 |
| 4-Ph3—O1-Oc-Ph1—Ph3—F | 4 | 4 | 4 |
| 5-Ph3—O1-Oc-Ph1—Ph3—F |  |  |  |
| $T_{ni}$ (° C.) | 94.1 | 96.8 | 101.3 |
| T→N (° C.) | −28 | −37 | −34 |
| $\Delta n$ | 0.112 | 0.106 | 0.109 |
| $n_o$ | 1.493 | 1.489 | 1.490 |
| $\Delta \epsilon$ | 4.7 | 4.9 | 4.9 |
| $\epsilon_\perp$ | 2.8 | 2.9 | 2.9 |
| $\gamma_1$/mPa·s | 59 | 63 | 69 |
| $\eta$/mPa·s | 11.7 | 12.4 | 12.9 |
| $V_{th}/V_{rms}$ | 2.329 | 2.231 | 2.298 |

Examples 35 and 36

The liquid crystal compositions prepared and their physical properties are shown below.

TABLE 10

|  | Example 35 | Example 36 |
|---|---|---|
| 3-Cy-Cy-1d0 | 38 | 44 |
| 5-Cy-Cy-1d0 |  | 3 |
| 0d1-Cy-Cy-Ph-1 | 14 | 14 |
| 0d3-Cy-Cy-Ph-1 | 12 | 9 |
| 0d1-Cy-Ph—Ph-3 |  |  |
| 3-Cy-Ph—Ph-2 |  |  |
| 1-Ph—Ph1—Ph-3d0 | 4 | 2 |
| 2-Ph—Ph1—Ph-3d0 | 7 | 6 |
| 3-Ph—Ph1—Ph-3d0 | 8 | 6 |
| 3-Cy-Cy-VO—Ph-Cy-3 | 3 | 4 |
| 3-Ph3—O1-Oc-Ph—Ph3—F | 3 | 3 |
| 4-Ph3—O1-Oc-Ph—Ph3—F | 4 | 4 |
| 3-Ph3—O1-Oc-Ph1—Ph3—F | 4 | 5 |
| 5-Ph3—O1-Oc-Ph1—Ph3—F | 3 |  |
| Tni (° C.) | 107.6 | 99.9 |
| T→N (° C.) | −40 | −35 |
| Δn | 0.119 | 0.104 |
| no | 1.493 | 1.489 |
| Δε | 4.1 | 3.3 |
| ε⊥ | 3.0 | 2.9 |
| γ1/mPa·s | 69 | 53 |
| η/mPa·s | 13.1 | 11.4 |
| Vth/Vrms | 2.648 | 2.652 |
| K11/pN |  |  |
| K22/pN |  |  |
| K33/pN |  |  |
| Low-temperature storage property (−30° C.) (hr/A or F) | 168 hr/A |  |

Examples 37 to 40

The liquid crystal compositions prepared and their physical properties are shown below.

TABLE 11

|  | Example 37 | Example 38 | Example 39 | Example 40 |
|---|---|---|---|---|
| 3-Cy-Cy-1d0 | 44 | 44 | 38 | 40 |
| 5-Cy-Cy-1d0 |  | 2 |  |  |
| 0d1-Cy-Cy-Ph-1 | 5 | 6 | 10 | 10 |
| 0d3-Cy-Cy-Ph-1 | 5 | 5 | 9 | 10 |
| 1-Ph—Ph1—Ph-3d0 | 4 | 4 |  | 3 |
| 2-Ph—Ph1—Ph-3d0 | 5 | 6 | 6 | 4 |
| 2-Cy-Cy-Ph1—F | 3 | 2 | 3 | 2 |
| 3-Cy-Cy-Ph1—F | 4 | 3 | 4 | 3 |
| 3-Ph—Ph3—CFFO—Np3—F | 12 | 12 | 12 | 12 |
| 4-Cy-Ph1—Ph3—O1—Ph3—F | 4 | 4 | 4 | 4 |
| 3-Ph3—O1-Oc-Ph1—Ph3—F | 4 | 4 | 4 | 4 |
| 4-Ph3—O1-Oc-Ph1—Ph3—F | 6 | 5 | 6 | 5 |
| 5-Ph3—O1-Oc-Ph1—Ph3—F | 4 | 3 | 4 | 3 |
| Tni (° C.) | 79.8 | 79.8 | 87.8 | 88.2 |
| T→N (° C.) | −27 | −29 | −33 | −29 |
| Δn | 0.106 | 0.106 | 0.105 | 0.106 |
| no | 1.488 | 1.488 | 1.489 | 1.489 |
| Δε | 9.1 | 8.1 | 9.5 | 8.3 |
| ε⊥ | 3.6 | 3.5 | 3.5 | 3.4 |
| γ1/mPa·s | 62 | 59 | 74 | 69 |
| η/mPa·s | 13.5 | 12.3 | 15.1 | 13.9 |
| Vth/Vrms | 1.531 | 1.628 | 1.603 | 1.709 |
| Low-temperature storage property (−25° C.) (hr/A or F) | 504 hr/A | 168 hr/A | 168 hr/A | 672 hr/A |

Examples 41 and 42

The liquid crystal compositions prepared and their physical properties are shown below.

TABLE 12

|  | Example 41 | Example 42 |
|---|---|---|
| 3-Cy-Cy-1d0 | 39 | 42 |
| 0d1-Cy-Cy-Ph-1 | 8 | 7 |
| 0d3-Cy-Cy-Ph-1 | 8 | 7 |
| 2-Ph—Ph1—Ph-3d0 | 6 |  |
| 2-Ph—Ph1—Np-3 |  | 5 |
| 2-Cy-Cy-Ph1—F | 4 | 4 |
| 3-Cy-Cy-Ph1—F | 5 | 5 |
| 3-Ph—Ph3—CFFO—Np3—F | 12 | 12 |
| 4-Cy-Ph1—Ph3—O1—Ph3—F | 4 | 4 |
| 3-Ph3—O1-Oc-Ph1—Ph3—F | 4 | 4 |
| 4-Ph3—O1-Oc-Ph1—Ph3—F | 6 | 6 |
| 5-Ph3—O1-Oc-Ph1—Ph3—F | 4 | 4 |
| Tni (° C.) | 85.2 | 84.9 |
| T→N (° C.) | −33 | −29 |
| Δn | 0.104 | 0.103 |
| no | 1.488 | 1.488 |
| Δε | 9.5 | 9.5 |
| ε⊥ | 3.6 | 3.6 |
| γ1/mPa·s | 69 | 70 |
| η/mPa·s | 14.7 | 14.5 |
| Vth/Vrms | 1.562 | 1.532 |
| Low-temperature storage property (−25° C.) (hr/A or F) | 672 hr/A |  |

Examples 43 to 46

The liquid crystal compositions prepared and their physical properties are shown below.

TABLE 13

|  | Example 43 | Example 44 | Example 45 | Example 46 |
| --- | --- | --- | --- | --- |
| 3-Cy-Cy-1d0 | 46 | 37.5 | 30 | 49 |
| 3-Cy-Cy-1d1 | 4.5 | 10 | 6 |  |
| 0d1-Cy-Cy-Ph-1 | 8 | 10 |  |  |
| 0d3-Cy-Cy-Ph-1 |  | 5 | 8 |  |
| 2-Ph—Ph1—Ph-3d0 | 5 |  | 4 |  |
| 3-Ph—Ph1—Ph3—O2d0 |  |  |  | 15 |
| 3-Cy-Cy-Ph1—F | 4 |  |  |  |
| 2-Cy-Ph—Ph3—O1—Ph3—F | 3 |  |  |  |
| 3-Cy-Ph—Ph3—O1—Ph3—F | 5 | 5 |  |  |
| 4-Cy-Ph1—Ph3—O1—Ph3—F |  |  |  | 4 |
| 3-Ph3—O1-Oc-Ph—Ph3—F | 4 | 4 | 4 |  |
| 4-Ph3—O1-Oc-Ph—Ph3—F |  |  | 4 |  |
| 3-Ph3—O1-Oc-Ph1—Ph3—F | 6 | 6 | 6 | 6 |
| 5-Ph3—O1-Oc-Ph1—Ph3—F |  |  | 5 |  |
| 3-Ph—Ph3—CFFO—Ph3—F |  | 11.5 | 11 | 6 |
| 3-Cy-Cy-CFFO—Ph3—F | 4 |  | 6 |  |
| 3-Ph—Ph1—Ph3—CFFO—Ph3—F |  |  | 3 | 3 |
| 4-Ph—Ph1—Ph3—CFFO—Ph3—F | 4.5 |  | 5 | 5 |
| 3-Pr—Ph—Ph3—CFFO—Ph3—F |  | 7 | 8 | 8 |
| 5-Cy-Ph—Ph1—Ph-3 | 6 | 4 |  | 4 |
| Tni (° C.) | 90.0 | 80.5 | 75.1 | 74.0 |
| T→N (° C.) | −38 | −44 | −30 | −35 |
| Δn | 0.100 | 0.097 | 0.114 | 0.119 |
| no | 1.488 | 1.492 | 1.502 | 1.501 |
| Δ∈ | 7.3 | 8.5 | 15.3 | 10.4 |
| ∈⊥ | 3.4 | 3.5 | 4.5 | 3.9 |
| γ1/mPa · s | 58 | 65 | 96 | 59 |
| η/mPa · s | 11.8 | 12.6 | 19.0 | 12.7 |
| Vth/Vrms | 1.80 | 1.58 | 1.01 | 1.35 |

The invention claimed is:

1. A liquid crystal composition having positive dielectric anisotropy, comprising at least one compound represented by general formula (LC0):

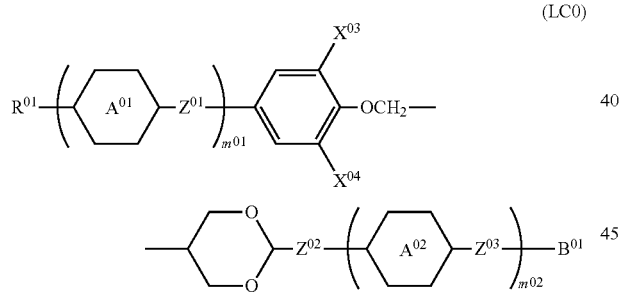

(LC0)

(In the formula, $R^{01}$ represents an alkyl group having 1 to 15 carbon atoms, one or more —CH$_2$— in the alkyl group may each be substituted with —O—, —CH═CH—, —CO—, —OCO—, —COO—, —C≡C—, —CF$_2$O—, or —OCF$_2$— so long as oxygen atoms are not directly adjacent to each other, one or more hydrogen atoms in the alkyl group may each be substituted with a halogen, $A^{01}$ and $A^{02}$ each independently represent a trans-1,4-cyclohexylene group, a 1,4-phenylene group, a 3-fluoro-1,4-phenylene group, a 3,5-difluoro-1,4-phenylene group, a 1,4-cyclohexenylene group, a 1,4-bicyclo[2.2.2]octylene group, a naphthalene-2,6-diyl group, a decahydronaphthalene-2,6-diyl group, or a 1,2,3,4-tetrahydronaphthalene-2,6-diyl group, $B^{01}$ represents one of the following structures:

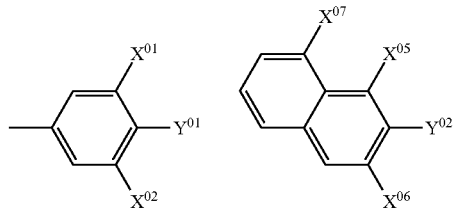

(In the structures, $X^{01}$, $X^{02}$, $X^{05}$, $X^{06}$, and $X^{07}$ each independently represent a hydrogen atom or a fluorine atom and $Y^{01}$ and $Y^{02}$ each independently represent a chlorine atom, a cyano group, a fluorine atom, —CF$_3$, or —OCF$_3$), $Z^{01}$, $Z^{02}$, and $Z^{03}$ each independently represent a single bond, —CH═CH—, —C≡C—, —CH$_2$CH$_2$—, —(CH$_2$)$_4$—, —OCH$_2$—, —CH$_2$O—, —OCF$_2$—, or —CF$_2$O—, $X^{03}$ and $X^{04}$ each independently represent a hydrogen atom or a fluorine atom, $m^{01}$ and $m^{02}$ each independently represent an integer of 0 to 2, $m^{01}+m^{02}$ is 0, 1, or 2, and when two or more $A^{01}$, $A^{02}$, $Z^{01}$ and/or $Z^{03}$ are present, they may be the same or different) and at least one compound represented by general formula (LC1):

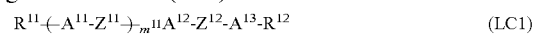

(LC1)

(In the formula, $R^{11}$ and $R^{12}$ each independently represent an alkyl group having 1 to 15 carbon atoms, one or more —CH$_2$— in the alkyl group may each be substituted with —O—, —CH═CH—, —CO—, —OCO—, —COO—, —C≡C—, —CF$_2$O—, or —OCF$_2$— so long as oxygen atoms are not directly adjacent to each other, one or more hydrogen atoms in the alkyl group may each be substituted with a halogen, $A^{11}$ to $A^{13}$ each independently represent a trans-1,4-cyclohexylene group, a 1,4-phenylene group, a 2-fluoro-1,4-phenylene group, a 3-fluoro-1,4-phenylene group, a 2,5-difluoro-1,4-phenylene group, a 3,5-difluoro-1,4-phenylene group, a 1,4-cyclohexenylene group, a tetrahydropyran-2,5-diyl group, a 1,3-dioxane-2,5-diyl group, a 1,4-bicyclo[2.2.2]octylene group, a naphthalene-2,6-diyl group, a decahydronaphthalene-2,6-diyl group, or a 1,2,3,4-tetrahydronaphthalene-2,6-diyl group, $Z^{11}$ and $Z^{12}$ each independently represent a single bond, —CH=CH—, —C≡C—, —CH$_2$CH$_2$—, —(CH$_2$)$_4$—, —OCH$_2$—, —CH$_2$O—, —OCF$_2$—, or —CF$_2$O—, $m^{11}$ represents 0, 1, or 2, and when two or more $A^{11}$ and/or $Z^{11}$ are present, they may be the same or different).

2. The liquid crystal composition according to claim 1, comprising at least one compound represented by general formula (LC2):

(LC2)

(In the formula, $R^{2'}$ represents an alkyl group having 1 to 15 carbon atoms, one or more —CH$_2$— in the alkyl group may each be substituted with —O—, —CH=CH—, —CO—, —OCO—, —COO—, —C≡C—, —CF$_2$O—, or —OCF$_2$— so long as oxygen atoms are not directly adjacent to each other, one or more hydrogen atoms in the alkyl group may each be substituted with a halogen, $A^{21}$ and $A^{22}$ each independently represent a trans-1,4-cyclohexylene group, a 1,4-phenylene group, a 3-fluoro-1,4-phenylene group, a 3,5-difluoro-1,4-phenylene group, a 1,4-cyclohexenylene group, a tetrahydropyran-2,5-diyl group, a 1,3-dioxane-2,5-diyl group, a 1,4-bicyclo[2.2.2]octylene group, a naphthalene-2,6-diyl group, a decahydronaphthalene-2,6-diyl group, or a 1,2,3,4-tetrahydronaphthalene-2,6-diyl group, $B^{21}$ represents one of the following structures:

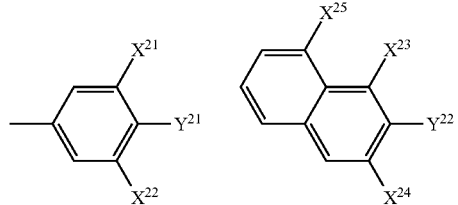

(In the structures, $X^{21}$ to $X^{25}$ each independently represent a hydrogen atom or a fluorine atom and $Y^{21}$ and $Y^{22}$ each independently represent a chlorine atom, a cyano group, a fluorine atom, —CF$_3$, —OCF$_3$, —CF$_2$CF$_3$, —CHFCF$_3$, —OCF$_2$CF$_3$, —OCHFCF$_3$, or —OCF=CF$_2$), $Z^{21}$ and $Z^{22}$ each independently represent a single bond, —CH=CH—, —C≡C—, —CH$_2$CH$_2$—, —(CH$_2$)$_4$—, —OCH$_2$—, —CH$_2$O—, —OCF$_2$—, or —CF$_2$O—, $m^{21}$ represents 0, 1, 2, or 3, and when two or more $A^{21}$ and/or $Z^{21}$ are present, they may be the same or different, However, compounds represented by general formula (LC0) are excluded).

3. The liquid crystal composition according to claim 2, comprising at least one compound represented by general formula (LC2-a) as the compound represented by general formula (LC2):

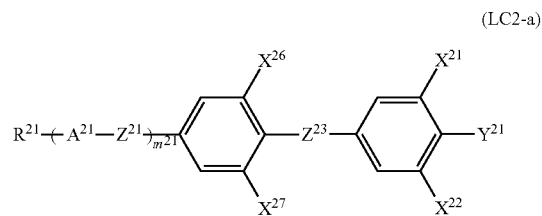

(LC2-a)

(In the formula, $X^{26}$ and $X^{27}$ each independently represent a hydrogen atom or a fluorine atom, $Z^{23}$ represents —OCH$_2$—, —CH$_2$O—, —OCF$_2$—, or —CF$_2$O—, and $R^{21}$, $A^{21}$, $Z^{21}$, $X^{21}$, $X^{22}$, $Y^{21}$, and $m^{21}$ are respectively the same as $R^{21}$, $A^{21}$, $Z^{21}$, $X^{21}$, $X^{22}$, $Y^{21}$, and $m^{21}$ in general formula (LC2)).

4. The liquid crystal composition according to claim 3, further comprising, as the compound represented by general formula (LC2), at least one compound represented by general formula (LC2-b):

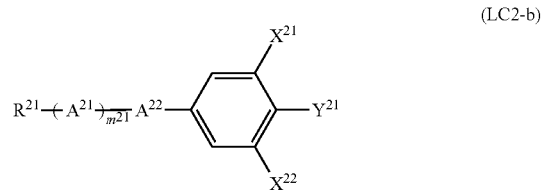

(LC2-b)

(In the formula, $R^{21}$, $A^{21}$, $A^{22}$, $X^{21}$, $X^{22}$, $Y^{21}$, and $m^{21}$ are respectively the same as $R^{21}$, $A^{21}$, $A^{22}$, $X^{21}$, $X^{22}$, $Y^{21}$, and $m^{21}$ in general formula (LC2)).

5. The liquid crystal composition according to claim 1, wherein the compound represented by general formula (LC1) is contained in an amount of 20% to 99% by mass.

6. The liquid crystal composition according to any one of claim 1, wherein the compound represented by general formula (LC0) is contained in an amount of 1% to 50% by mass.

7. The liquid crystal composition according to claim 1, comprising at least one polymerizable compound.

8. A liquid crystal display device using the liquid crystal composition according to claim 1.

9. An active matrix drive liquid crystal display device using the liquid crystal composition according to claim 1.

10. A liquid crystal display device for TN, OCB, ECB, IPS, or VA-IPS mode, using the liquid crystal composition according to claim 1.

11. A polymer-stabilized liquid crystal display device for TN, OCB, ECB, IPS, or VA-IPS mode, prepared by using the liquid crystal composition according to claim 7 through polymerizing the polymerizable compound contained in the liquid crystal composition in the absence or presence of applied voltage.

* * * * *